(12) United States Patent
Choi et al.

(10) Patent No.: US 11,190,320 B2
(45) Date of Patent: Nov. 30, 2021

(54) METHOD FOR GENERATING SRS SEQUENCE AND TERMINAL THEREFOR

(71) Applicant: LG Electronics Inc., Seoul (KR)

(72) Inventors: Kukheon Choi, Seoul (KR); Jonghyun Park, Seoul (KR); Jiwon Kang, Seoul (KR); Kyuseok Kim, Seoul (KR); Minki Ahn, Seoul (KR); Kilbom Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/617,064

(22) PCT Filed: Jun. 18, 2018

(86) PCT No.: PCT/KR2018/006819
§ 371 (c)(1),
(2) Date: Nov. 26, 2019

(87) PCT Pub. No.: WO2018/231024
PCT Pub. Date: Dec. 20, 2018

(65) Prior Publication Data
US 2020/0092055 A1  Mar. 19, 2020

Related U.S. Application Data

(60) Provisional application No. 62/520,565, filed on Jun. 16, 2017.

(51) Int. Cl.
*H04L 27/26* (2006.01)
*H04L 5/00* (2006.01)
(Continued)

(52) U.S. Cl.
CPC .......... *H04L 5/005* (2013.01); *H04L 27/2613* (2013.01); *H04W 72/0446* (2013.01);
(Continued)

(58) Field of Classification Search
CPC ....... H04L 5/14; H04L 5/0048; H04L 5/0091; H04L 5/005; H04L 5/001; H04L 27/2613;
(Continued)

(56) References Cited

U.S. PATENT DOCUMENTS 10,419,175 B2* 9/2019 Kim ................... H04W 16/10
2017/0064558 A1* 3/2017 Li ......................... H04L 5/005
2020/0177342 A1* 6/2020 Pawar ................ H04L 5/0007

OTHER PUBLICATIONS

LG Electronics, "On SRS design and related operations", 3GPP TSG RAN WG1 Meeting #88bis, Apr. 3-7, 2017, R1-1704892.
(Continued)

*Primary Examiner* — Wei Zhao
(74) *Attorney, Agent, or Firm* — Dentons US LLP

(57) ABSTRACT

A method for generating an SRS sequence by a terminal may comprise the steps of: calculating a first root value for generation of an SRS sequence of a first block among concatenated blocks configured for transmission of an SRS, using a terminal-specific SRS identifier; calculating a second root value for generation of an SRS sequence of a second block on the basis of the calculated first root value and a root offset value; and generating an SRS sequence for transmission of an SRS on the concatenated blocks by applying the first root value to the first block and applying the second root value to the second block.

20 Claims, 11 Drawing Sheets

(51) Int. Cl.
*H04W 72/04* (2009.01)
*H04W 72/12* (2009.01)
*H04W 76/27* (2018.01)

(52) U.S. Cl.
CPC ...... *H04W 72/1268* (2013.01); *H04W 72/042* (2013.01); *H04W 76/27* (2018.02)

(58) Field of Classification Search
CPC ......... H04W 72/0446; H04W 72/1268; H04W 72/042; H04W 76/27
See application file for complete search history.

(56) References Cited

OTHER PUBLICATIONS

ZTE, "Discussion on SRS design for NR", 3GPP TSG RAN WG1 Meeting #89, May 15-19, 2017, R1-1707133.
Intel Corporation, "Discussion on SRS for NR", 3GPP TSG RAN WG1 Meeting #89, May 15-19, 2017, R1-1707368.
Huawei, HiSilicon, "UL SRS sequence design in NR", 3GPP TSG RAN WG1 Meeting #89, May 15-19, 2017, R1-1708171.
Mitsubishi Electric, Huawei, HiSilicon, Nokia, AT&T, Intel, ZTE, LG Electronics, Panasonic, Ericsson, "WF on SRS sequence generation", 3GPP TSG RAN WG1 Meeting #89, May 15-19, 2017, R1-1709699.
LG Electronics, "On SRS design and related operations", 3GPP TSG RAN WG1 NR Ad-Hoc#2, Jun. 27-30, 2017, R1-1710298.

* cited by examiner frequency (a) evaluation of cross-correlation (b) evaluation of cubic-metric

METHOD FOR GENERATING SRS SEQUENCE AND TERMINAL THEREFOR

TECHNICAL FIELD

The present disclosure relates to wireless communication, and more particularly, to a method for generating SRS sequence and a UE therefor.

BACKGROUND ART

With the introduction of a new radio access technology (RAT) system, as more and more communication devices require greater communication capacity, there is a need for mobile broadband communication enhanced over conventional Radio Access Technology (RAT).

In addition, massive Machine Type Communications (MTC) capable of providing a variety of services anywhere and anytime by connecting multiple devices and objects is one of important issues to be considered in the next-generation communications. Communication system design considering services/UEs sensitive to reliability and latency is also under discussion. Thus, the new RAT is to provide services considering enhanced Mobile Broadband (eMBB) communication, massive MTC (mMTC), and Ultra-Reliable and Low Latency Communication (URLLC).

DISCLOSURE

Technical Problem

An object of the present disclosure is to provide a method for generating SRS sequence by a UE.

Another object of the present disclosure is to provide a UE for generating SRS sequence.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

To achieve the object of the present disclosure, a method for generating a sounding reference symbol (SRS) sequence by a user equipment (UE) according to one embodiment of the present disclosure may comprise the steps of calculating a first root value for SRS sequence generation of a first block among concatenated blocks configured for SRS transmission, using a UE-specific SRS identifier; calculating a second root value for SRS sequence generation of a second block based on the calculated first root value and a root offset value; and generating an SRS sequence for SRS transmission on the concatenated blocks by applying the first root value to the first block and applying the second root value to the second block.

The method may further comprise the step of receiving control information including information on the UE-specific SRS identifier or the root offset value from a base station. The information on the root offset value may include root offset values respectively related with the second block and a third block when the concatenated blocks include the third block. The root offset values respectively related with the second block and the third block may be different from each other. The control information may be received through radio resource control (RRC) signaling, MAC control element (CE) or downlink control information (DCI).

The method may further comprise the step of generating an SRS sequence for the third block by applying the first root value and the root offset value related with the third block to the third block when the concatenated blocks include the third block.

The first block may be determined by the base station or may be related with the block having the lowest block index among the concatenated blocks. The first block and the second block may be resources configured on a resource block (RB) basis.

The method may further comprise the step of transmitting the SRS on the concatenated blocks to which the generated SRS sequence is applied.

The method may further comprise the steps of transmitting a first SRS on first concatenated blocks related with the concatenated blocks to which the generated SRS sequence is applied, at a first SRS transmission timing; generating SRS sequence for second concatenated blocks in the same manner as the SRS sequence generation manner for the first concatenated blocks; and transmitting a second SRS on the second concatenated block to which SRS sequence for the generated concatenated blocks is applied, at a second SRS transmission timing, wherein the second concatenated blocks may be related with blocks configured by position change of the first concatenated blocks on a frequency domain. The first concatenated blocks and the second concatenated blocks may be overlapped with each other on the frequency domain.

To achieve the object of the present disclosure, a method for generating a sounding reference symbol (SRS) sequence in a user equipment (UE) according to another embodiment of the present disclosure may comprise the steps of calculating a first root value for SRS sequence generation of a first block among concatenated blocks configured for SRS transmission, using a UE-specific SRS identifier; and generating an SRS sequence for SRS transmission on the concatenated blocks by applying the first root value to the first block and applying a second root value to a second block, wherein the second root value may be determined based on the UE-specific SRS identifier, a root offset value, and a position of a transmission resource of the SRS.

The method may further comprise the step of receiving information on the second root value from a base station. The first block may be determined by the base station or may be related with the block having the lowest block index among the concatenated blocks, and the second block may be related with the other blocks except the first block among the concatenated blocks.

To achieve the object of the present disclosure, a UE for generating a sounding reference symbol (SRS) sequence according to one embodiment of the present disclosure may comprise a processor configured to calculate a first root value for SRS sequence generation of a first block among concatenated blocks configured for SRS transmission, using a UE-specific SRS identifier, calculate a second root value for SRS sequence generation of a second block based on the calculated first root value and a root offset value, and generate an SRS sequence for SRS transmission on the concatenated blocks by applying the first root value to the first block and applying the second root value to the second block.

The UE may further comprise a receiver configured to receive control information including information on the UE-specific SRS identifier or the root offset value from a base station.

The processor may be configured to generate the SRS sequence by applying the first root value and the root offset value related with a third block to the third block when the concatenated blocks include the third block.

The UE may further comprise a transmitter configured to transmit the SRS on the concatenated blocks to which the generated SRS sequence is applied.

To achieve the object of the present disclosure, a UE for generating a sounding reference symbol (SRS) sequence according to another embodiment of the present disclosure may comprise a processor configured to calculate a first root value for SRS sequence generation of a first block among concatenated blocks configured for SRS transmission, using a UE-specific SRS identifier, and generate an SRS sequence for SRS transmission on the concatenated blocks by applying the first root value to the first block and applying a second root value to a second block, wherein the second root value may be determined based on the UE-specific SRS identifier, a root offset value, and a position of a transmission resource of the SRS.

The UE may further comprise a receiver configured to receive information on the second root value from a base station.

Advantageous Effects

A UE may improve flexible utilization of uplink resources through a method for generating a root value of each block using SRS ID and SRS hopping method indicating a root value varied depending on SRS transmission slot or symbol timing through SRS ID in a state that the UE generates ZC based sequence at a block length and SRS BW (concatenated blocks) are configured by connecting these blocks.

The effects that can be achieved through the embodiments of the present disclosure are not limited to what has been particularly described hereinabove and other effects which are not described herein can be derived by those skilled in the art from the following detailed description.

BRIEF DESCRIPTION OF THE DRAWINGS

The accompanying drawings, which are included to provide a further understanding of the invention and are incorporated in and constitute a part of this specification, illustrate embodiments of the invention.

BEST MODE FOR CARRYING OUT THE INVENTION

Figure 1:
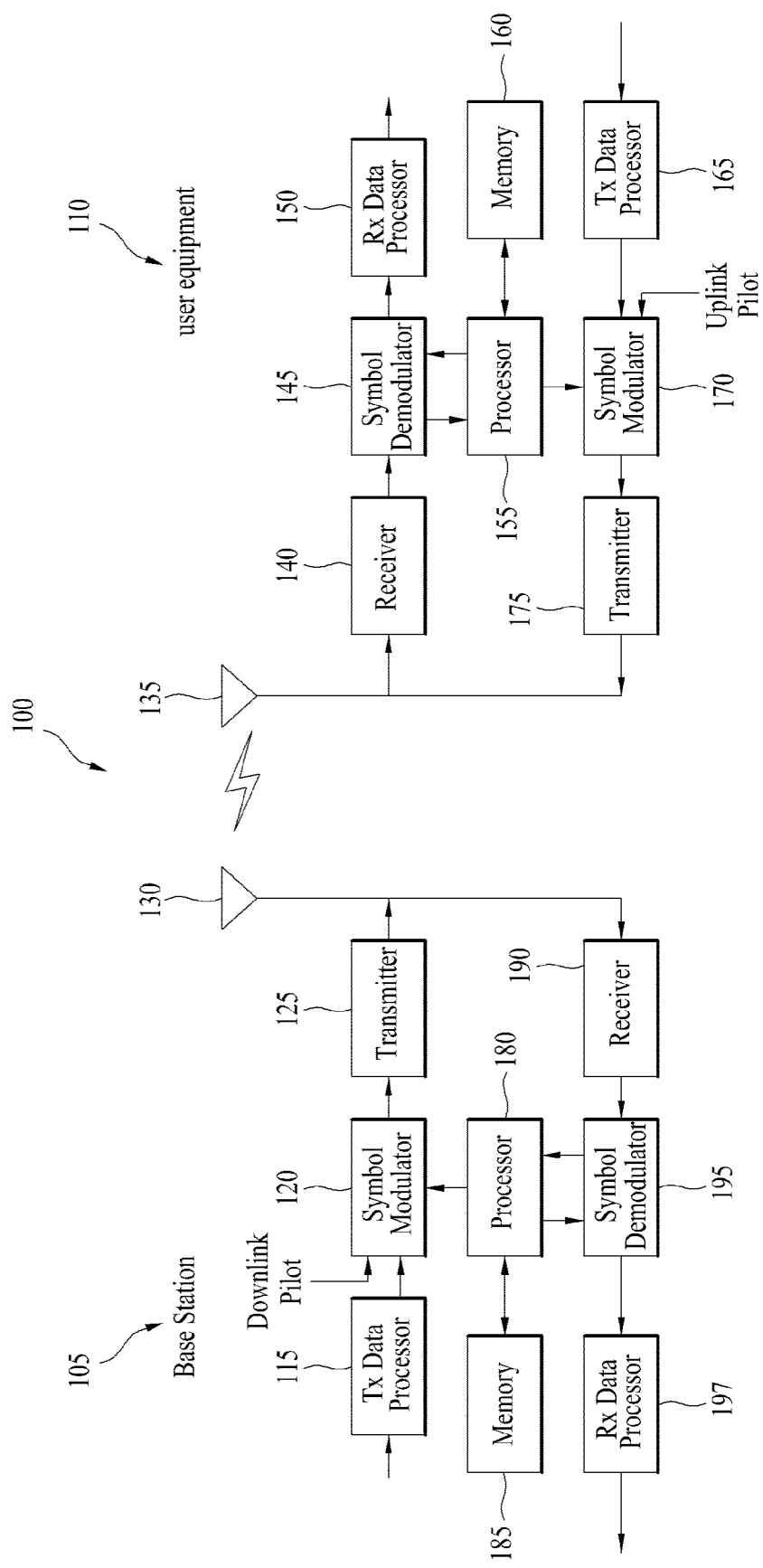
FIG. 1 is a block diagram for configurations of a base station 105 and a user equipment 110 in a wireless communication system 100.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a block diagram for configurations of a base station 105 and a user equipment 110 in a wireless communication system 100.

Although one base station 105 and one user equipment 110 are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present disclosure supports an MIMO (multiple input multiple output) system. And, the base station 105 according to the present disclosure may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

First, Table 1 below shows details of SRS transmission in the 3GPP LTE/LTE-A system.

TABLE 1

A UE shall transmit Sounding Reference Symbol (SRS) on per serving cell SRS resources based on two trigger types:
trigger type 0: higher layer signalling
trigger type 1: DCI formats 0/4/1A for FDD and TDD and DCI formats 2B/2C/2D for TDD.
In case both trigger type 0 and trigger type 1 SRS transmissions would occur in the same subframe in the same serving cell, the UE shall only transmit the trigger type 1 SRS transmission.
A UE may be configured with SRS parameters for trigger type 0 and trigger type 1 on each serving cell. The following SRS parameters are serving cell specific and semi-statically configurable by higher layers for trigger type 0 and for trigger type 1.
Transmission comb $\bar{k}_{TC}$, as defined in subclause 5.5.3.2 of [3] for trigger type 0 and each configuration of trigger type 1
Starting physical resource block assignment $n_{RRC}$, as defined in subclause 5.5.3.2 of [3] for trigger type 0 and each configuration of trigger type 1
duration: single or indefinite (until disabled), as defined in [11] for trigger type 0
srs-ConfigIndex $I_{SRS}$ for SRS periodicity $T_{SRS}$ and SRS subframe offset $T_{offset}$, as defined in Table 8.2-1 and Table 8.2-2 for trigger type 0 and SRS periodicity $T_{SRS,1}$, and SRS subframe offset $T_{SRS,1}$, as defined in Table 8.2-4 and Table 8.2-5 trigger type 1
SRS bandwidth $B_{SRS}$, as defined in subclause 5.5.3.2 of [3] for trigger type 0 and each configuration of trigger type 1
Frequency hopping bandwidth, $b_{hop}$, as defined in subclause 5.5.3.2 of [3] for trigger type 0
Cyclic shift $n_{SRS}^{cs}$, as defined in subclause 5.5.3.1 of [3] for trigger type 0 and each configuration of trigger type 1
Number of antenna ports $N_p$ for trigger type 0 and each configuration of trigger type 1
For trigger type 1 and DCI format 4 three sets of SRS parameters, srs-ConfigApDCI-Format4, are configured by higher layer signalling. The 2-bit SRS request field [4] in DCI format 4 indicates the SRS parameter set given in Table 8.1-1. For trigger type 1 and DCI format 0, a single set of SRS parameters, srs-ConfigApDCI-Format0, is configured by higher layer signalling. For trigger type 1 and DCI formats 1A/2B/2C/2D, a single common set of SRS parameters, srs-ConfigApDCI-Format1a2b2c, is configured by higher layer signalling. The SRS request field is 1 bit [4] for DCI formats 0/1A/2B/2C/2D, with a type 1 SRS triggered if the value of the SRS request field is set to '1'.
A 1-bit SRS request field shall be included in DCI formats 0/1A for frame structure type 1 and 0/1A/2B/2C/2D for frame structure type 2 if the UE is configured with SRS parameters for DCI formats 0/1A/2B/2C/2D by higher-layer signalling.

Table 2 below shows SRS request values for trigger type 1 of DCI format 4 in the 3GPP LTE/LTE-A system.

TABLE 2

| Value of SRS request field | Description |
| --- | --- |
| '00' | No type 1 SRS trigger |
| '01' | The 1st SRS parameter set configured by higher layers |
| '10' | The 2nd SRS parameter set configured by higher layers |
| '11' | The 3rd SRS parameter set configured by higher layers |

Table 3 below shows additional details of the SRS transmission in the 3GPP LTE/LTE-A system.

TABLE 3

The serving cell specific SRS transmission bandwidths $C_{SRS}$ are configured by higher layers. The allowable values are given in subclause 5.5.3.2 of [3].
The serving cell specific SRS transmission sub-frames are configured by higher layers. The allowable values are given in subclause 5.5.3.3 of [3].
For a TDD serving cell, SRS transmission can occur in UpPTS and uplink subframes of the UL/DL configuration indicated by the higher layer parameter subframeAssignment for the serving cell.
When closed-loop UE transmit antenna selection is enabled for a given serving cell for a UE that supports transmit antenna selection, the index $a(n_{SRS})$, of the UE antenna that transmits the SRS at time $n_{SRS}$ is given by
$a(n_{SRS}) = n_{SRS} \bmod 2$, for both partial and full sounding bandwidth, and when frequency hopping is disabled (i.e., $b_{hop} \geq B_{SRS}$), $$a(n_{SRS}) = \begin{cases} (n_{SRS} + \lfloor n_{SRS}/2 \rfloor + \beta \cdot \lfloor n_{SRS}/K \rfloor) \bmod 2 & \text{when } K \text{ is even} \\ n_{SRS} \bmod 2 & \text{when } K \text{ is odd} \end{cases},$$

$$\beta = \begin{cases} 1 & \text{where } K \bmod 4 = 0 \\ 0 & \text{otherwise} \end{cases}$$

when frequency hopping is enabled (i.e. $b_{hop} < B_{SRS}$),
where values $B_{SRS}$, $b_{hop}$, $N_b$, and $n_{SRS}$ are given in subclause 5.5.3.2 of [3], and TABLE 3-continued $$K = \prod_{b'=b_{hop}}^{B_{SRS}} N_b$$

(where $N_{b_{hop}}$ = 1 regardless of the $N_b$ value), except when a single SRS transmission is configured for the UE. If a UE is configured with more than one serving
cell, the UE is not expected to transmit SRS on different antenna ports simultaneously.
A UE may be configured to transmit SRS on Np antenna ports of a serving cell where
Np may be configured by higher layer signalling. For PUSCH transmission mode 1
$N_p \in \{0,1,2,4\}$ and for PUSCH transmission mode 2 $N_p \in \{0,1,2\}$ with two antenna
ports configured for PUSCH and $N_p \in \{0,1,4\}$ with 4 antenna ports configured for
PUSCH. A UE configured for SRS transmission on multiple antenna ports of a serving
cell shall transmit SRS for all the configured transmit antenna ports within one SC-
FDMA symbol of the same subframe of the serving cell.
The SRS transmission bandwidth and starting physical resource block assignment are the
same for all the configured antenna ports of a given serving cell.
A UE not configured with multiple TAGs shall not transmit SRS in a symbol whenever
SRS and PUSCH transmissions happen to overlap in the same symbol.
For TDD serving cell, when one SC-FDMA symbol exists in UpPTS of the given serving
cell, it can be used for SRS transmission. When two SC-FDMA symbols exist in UpPTS
of the given serving cell, both can be used for SRS transmission and for trigger type 0
SRS both can be assigned to the same UE.
If a UE is not configured with multiple TAGs, or if a UE is configured with multiple
TAGs and SRS and PUCCH format 2/2a/2b happen to coincide in the same subframe in
the same serving cell,
    The UE shall not transmit type 0 triggered SRS whenever type 0 triggered SRS and
PUCCH format 2/2a/2b transmissions happen to coincide in the same subframe;
    The UE shall not transmit type 1 triggered SRS whenever type 1 triggered SRS and
PUCCH format 2a/2b or format 2 with HARQ-ACK transmissions happen to coincide in
the same subframe;
    The UE shall not transmit PUCCH format 2 without HARQ-ACK whenever type 1
triggered SRS and PUCCH format 2 without HARQ-ACK transmissions happen to
coincide in the same subframe.
If a UE is not configured with multiple TAGs, or if a UE is configured with multiple
TAGs and SRS and PUCCH happen to coincide in the same subframe in the same serving
cell,
    The UE shall not transmit SRS whenever SRS transmission and PUCCH
transmission carrying HARQ-ACK and/or positive SR happen to coincide in the same
subframe in the parameter ackNackSRS-SimultaneousTransmission is FALSE;
    For FDD-TDD and primary cell frame structure 1, the UE shall not transmit SRS in
a symbol whenever SRS transmission and PUCCH transmission carrying HARQ-ACK
and/or positive SR using shortened format as defined in subclauses 5.4.1 and 5.4.2A of
[3] happen to overlap in the same symbol if the parameter ackNackSRS-
SimultaneousTransmission in TRUE.
    Unless otherwise prohibited, the UE shall transmit SRS whenever SRS transmission
and PUCCH transmission carrying HARQ-ACK and/or positive SR using shortened
format as defined in subclauses 5.4.1 and 5.4.2A of [3] happen to coincide in the same
subframe if the parameter ackNackSRS-SimultaneousTransmission is TRUE.
A UE not configured with multiple TAGs shall not transmit SRS whenever SRS
transmission on any serving cells and PUCCH transmission carrying HARQ-ACK and/or
positive SR using normal PUCCH format as defined in subclauses 5.4.1 and 5.4.2A of
[3] happen to coincide in the same subframe.
In UpPTS, whenever SRS transmission instance overlaps with the PRACH region for
preamble format 4 or exceeds the range of uplink system bandwidth configured in the
serving cell, the UE shall not transmit SRS.
The parameter ackNackSRS-SimultaneousTransmission provided by higher layers
determines if a UE is configured to support the transmission of HARQ-ACK on PUCCH
and SRS in one subframe. If it is configured to support the transmission of HARQ-ACK
on PUCCH and SRS in one subframe, then in the cell specific SRS subframes of the
primary cell UE shall transmit HARQ-ACK and SR using the shortened PUCCH format
as defined in subclauses 5.4.1 and 5.4.2A of [3], where the HARQ-ACK or the SR
symbol corresponding to the SRS location is punctured.
This shortened PUCCH format shall be used in a cell specific SRS subframe of the
primary cell even if the UE does not transmit SRS in that subframe. The cell specific SRS
subframes are defined in subclause 5.5.3.3 of [3]. Otherwise, the UE shall use the normal
PUCCH format 1/1a/1b as defined in subclause 5.4.1 of [3] or normal PUCCH format 3
as defined in subclause 5.4.2A of [3] for the transmission of HARQ-ACK and SR.
Trigger type 0 SRS configuration of a UE in a serving cell for SRS periodicity, $T_{SRS}$, and
SRS subframe offset, $T_{offset}$, is defined in Table 8.2-1 and Table 8.2-2, for FDD and TDD
serving cell, respectively. The periodicity TSRS of the SRS transmission is serving cell
specific and is selected from the set {2, 5, 10, 20, 40, 80, 160, 320} ms or subframes.
For the SRS periodicity $T_{SRS}$ of 2 ms in TDD serving cell, two SRS resources are
configured in a half frame containing UL subframe(s) of the given serving cell.
Type 0 triggered SRS transmission instances in a given serving cell for TDD serving cell
with $T_{SRS}$ > 2 and for FDD serving cell are the subframes satisfying
$(10 \cdot n_f + k_{SRS} - T_{offset}) \mod T_{SRS} = 0$, where for FDD $k_{SRS} = \{0, 1, 0\}$ is the subframe index
within the frame, for TDD serving cell $k_{SRS}$ is defined in Table 8.2-3. The SRS
transmission instances for TDD serving cell with $T_{SRS} = 2$ are the subframes satisfying TABLE 3-continued $k_{SRS} - T_{offset}$:
For TDD serving cell, and a UE configured for type 0 triggered SRS transmission in serving cell c, and the UE configured with the parameter EIMTA-MainConfigServCell-r12 for serving cell c, if the UE does not detect an UL/DL configuration indication for radio frame m (as described in section 13.1), the UE shall not transmit trigger type 0 SRS in a subframe of radio frame m that is indicated by the parameter eimta-HarqReferenceConfig-r12 as a downlink subframe unless the UE transmits PUSCH in the same subframe.
Trigger type 1 SRS configuration of a UE in a serving cell for SRS periodicity, $T_{SRS,1}$, and SRS subframe offset, $T_{offset,1}$, is defined in Table 8.2-4 and Table 8.2-5, for FDD and TDD serving cell, respectively. The periodicity $T_{SRS,1}$ of the SRS transmission is serving cell specific and is selected from the set {2, 5, 10} ms or subframes.
For the SRS periodicity $T_{SRS,1}$ of 2 ms in TDD serving cell, two SRS resources are configured in a half frame containing UL subframe(s) of the given serving cell.
A UE configured for type 1 triggered SRS transmission in serving cell c and not configured with a carrier indicator field shall transmit SRS on serving cell c upon detection of a positive SRS request in PDCCH/EPDCCH scheduling PUSCH/PDSCH on serving cell c.
A UE configured for type 1 triggered SRS transmission in serving cell c and configured with a carrier indicator field shall transmit SRS on serving cell c upon detection of a positive SRS request in PDCCH/EPDCCH scheduling PUSCH/PDSCH with the value of carrier indicator field corresponding to serving cell c.
A UE configured for type 1 triggered SRS transmission on serving cell c upon detection of a positive SRS request in subframe n of serving cell c shall commence SRS transmission in the first subframe satisfying $n + k, k \geq 4$ and
$(10 \cdot n_f + k_{SRS} - T_{offset,1})$ mod $T_{SRS,1} = 0$ for TDD serving cell c with $T_{SRS,1} > 2$ and for FDD serving cell c,
$(k_{SRS} - T_{offset,1})$ mod $5 = 0$ for TDD serving cell c with $T_{SRS,1} = 2$
where for FDD serving cell c $k_{SRS} = \{0,1,\ldots,9\}$ is the subframe index within the frame $n_f$, for TDD serving cell c $k_{SRS}$ is defined in Table 8.2-3.
A UE configured for type 1 triggered SRS transmission is not expected to receive type 1 SRS triggering events associated with different values of trigger type 1 SRS transmission parameters, as configured by higher layer signalling, for the same subframe and the same serving cell.
For TDD serving cell c, and a UE configured with EIMTA-MainConfigServCell-r12 for a serving cell c, the UE shall not transmit SRS in a subframe of a radio frame that is indicated by the corresponding eIMTA-UL/DL-configuration as a downlink subframe.
A UE shall not transmit SRS whenever SRS and a PUSCH transmission corresponding to a Random Access Response Grant or a retransmission of the same transport block as part of the contention based random access procedure coincide in the same subframe.

Table 4 below shows the subframe offset configuration ($T_{offset}$) and UE-specific SRS periodicity ($T_{SRS}$) for trigger type 0 in FDD.

TABLE 4

| SRS Configuration Index $I_{SRS}$ | SRS Periodicity (ms) | SRS Subframe Offset |
|---|---|---|
| 0 - 1 | 2 | $I_{SRS}$ |
| 2 - 6 | 5 | $I_{SRS}$ - 2 |
| 7 - 16 | 10 | $I_{SRS}$ - 7 |
| 17 - 36 | 20 | $I_{SRS}$ - 17 |
| 37 - 76 | 40 | $I_{SRS}$ - 37 |
| 77 - 156 | 80 | $I_{SRS}$ - 77 |
| 157 - 316 | 160 | $I_{SRS}$ - 157 |
| 317 - 636 | 320 | $I_{SRS}$ - 317 |
| 637 - 1023 | reserved | reserved |

Table 5 below shows the subframe offset configuration ($T_{offset}$) and UE-specific SRS periodicity ($T_{SRS}$) for trigger type 0 in TDD.

TABLE 5

| SRS Configuration Index $I_{SRS}$ | SRS Periodicity (ms) | SRS Subframe Offset |
|---|---|---|
| 0 - 1 | 2 | $I_{SRS}$ |
| 2 - 6 | 5 | $I_{SRS}$ - 2 |
| 7 - 16 | 10 | $I_{SRS}$ - 7 |
| 17 - 36 | 20 | $I_{SRS}$ - 17 |
| 37 - 76 | 40 | $I_{SRS}$ - 37 |
| 77 - 156 | 80 | $I_{SRS}$ - 77 |
| 157 - 316 | 160 | $I_{SRS}$ - 157 |
| 317 - 636 | 320 | $I_{SRS}$ - 317 |
| 637 - 1023 | reserved | reserved |

TABLE 6

| SRS Configuration Index $I_{SRS}$ | SRS Periodicity (ms) | SRS Subframe Offset |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10 - 14 | 5 | $I_{SRS}$ - 10 |
| 15 - 24 | 10 | $I_{SRS}$ - 15 |
| 25 - 44 | 20 | $I_{SRS}$ - 25 |
| 45 - 84 | 40 | $I_{SRS}$ - 45 |
| 85 - 164 | 80 | $I_{SRS}$ - 85 |
| 165 - 324 | 160 | $I_{SRS}$ - 165 |
| 325 - 644 | 320 | $I_{SRS}$ - 325 |
| 645 - 1023 | reserved | reserved |

Table 7 shows $k_{SRS}$ for TDD.

TABLE 7

| | subframe index n | | | | | | | | | |
|---|---|---|---|---|---|---|---|---|---|---|
| | 1 | | | | | 6 | | | | |
| | 1st symbol of UpPTS | 2nd symbol of UpPTS | | | | 1st symbol of UpPTS | 2nd symbol of UpPTS | | | |
| | 0 | | 2 | 3 | 4 | 5 | | | 7 | 8 | 9 |
| $k_{SRS}$ in case UpPTS length of 2 symbols | 0 | 1 | 2 | 3 | 4 | | 5 | 6 | 7 | 8 | 9 |
| $k_{SRS}$ in case UpPTS length of 1 symbol | 1 | | 2 | 3 | 4 | | 6 | | 7 | 8 | 9 |

Table 8 below shows the subframe offset configuration ($T_{offset,1}$) and UE-specific SRS periodicity ($T_{SRS,1}$) for trigger type 1 in FDD.

TABLE 8

| SRS Configuration Index $I_{SRS}$ | SRS Periodicity (ms) | SRS Subframe Offset |
|---|---|---|
| 0 - 1 | 2 | $I_{SRS}$ |
| 2 - 6 | 5 | $I_{SRS}$ - 2 |
| 7 - 16 | 10 | $I_{SRS}$ - 7 |
| 17 - 31 | reserved | reserved |

Table 9 below shows the subframe offset configuration ($T_{offset,1}$) and UE-specific SRS periodicity ($T_{SRS,1}$) for trigger type 1 in TDD.

TABLE 9

| SRS Configuration Index $I_{SRS}$ | SRS Periodicity $T_{SRS,1}$ (ms) | SRS Subframe Offset $T_{offset,1}$ |
|---|---|---|
| 0 | reserved | reserved |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10 - 14 | 5 | $I_{SRS}$ - 10 |
| 15 - 24 | 10 | $I_{SRS}$ - 15 |
| 25 - 31 | reserved | reserved |

Table 10 and Table 11 below show description related to UE sounding procedure in an NR system.

TABLE 10

The UE can be configured with one or more Sounding Reference Symbol (SRS) resource sets as configured by the higher layer parameter SRS-ResourceSetConfig. For each SRS resource set, a UE may be configured with K ≥ 1 SRS resources (higher later parameter SRS-ResourceConfig), where the maximum value of K is indicated by [SRS_capability [13, 38.306]]. The SRS resource set applicability is configured by the higher layer parameter SRS-SetUse. When the higher layer parameter SRS-Set Use is set to 'BeamManagemen', only one SRS resource in each of multiple SRS sets can be transmitted at a given time instant. The SRS resources in different SRS resource sets can be transmitted simultaneously.
For aperiodic SRSt least one state of the DCI field is used to select at least one out of the configured SRS resource set.
The following SRS parameters are semi-statically configurable by higher layer parameter SRS-ResourceConfig.
  SRS-ResourceConfigId determines SRS resource configuration identify.
  Number of SRS ports as defined by the higher layer parameter NrofSRS-Ports in Subclause 6.4.1.4 of [4, TS 38.211].
  Time domain behaviour of SRS resource configuration as indicated by the higher layer parameter SRS-ResourceConfigTve, which can be periodic, semi-persistent, aperiodic SRS transmission as defined in Subclause 6.4.1.4 of [4, TS 38.211].
  Slot level periodicity and slot level offset as defined by the higher layer parameter SRS-SlotConfig for an SRS resource of type periodic or semi-persistent.
  Number of OFDM symbols in the SRS resource, starting OFDM symbol of the SRS resource within a slot including repetition factor R as defined by the higher layer parameter SRS-ResourceMapping in Subclause 6.4.1.4 of [4, TS 38.211].
  SRS bandwidth $B_{SRS}$ and $C_{SRS}$, as defined by the higher layer parameter SRS-FreqHopping in Subclause 6.4.1.4 of [4, TS 38.211].
  Frequency hopping bandwidth, $b_{hop}$, as defined by the higher layer parameter SRS-FreqHopping in Subclause 6.4.1.4 of [4, TS 38.211].
  Defining frequency domain position and configurable shift to align SRS allocation to 4 PRB grid, as defined by the higher layer parameter SRS-FreqDomainPosition in Subclause 6.4.1.4 of [4, TS 38.211].
  Cyclic shift, as defined by the higher layer parameter SRS-CyclicShiftConfig in Subclause 6.4.1.4 of [4, TS 38.211].
  Transmission comb value and comb offset as defined by the higher layer parameter SRS-TransmissionComb in Subclause 6:4.1.4 of [4].
  SRS sequence ID as defined by the higher layer parameter SRS-SequenceId in Subclause 6.4.1.4 of [4].
  The configuration of the spatial relation between a reference RS which can be an SSB/PBCH. CSI-RS or an SRS and the target SRS is indicated by the higher layer parameter SRS-SpatialRelationInfo.

TABLE 10-continued

The UE may be configured by the higher layer parameter SRS-ResourceMapping with an SRS resource occupying a location within the last 6 symbols of the slot.
When PUSCH and SRS are transmitted in the same slot, the UE may be configured to transmit SRS after the transmission of the PUSCH and the corresponding DM-RS.
For a UE configured with one or more SRS resource configuration(s), and when the higher layer parameter SRS-ResourceConfigType is set to 'periodic':
  if the UE is configured with the higher layer parameter SRS-SpatialRelationInfo set to 'SSB/PBCH', the UE shall transmit the SRS resource with the same spatial domain transmission filter used for the reception of the SSB/PBCH, if the higher layer parameter SRS-SpatialRelationInfo is set to 'CSI RS', the UE shall transmit the SRS resource with the same spatial domain transmission filter used for the reception of the periodic CSI-RS or of the scull-persistent CSI-RS, if the higher layer parameter SRS-SpatialRelationInfo is set to 'SRS', the UE shall transmit the SRS resource with the same spatial domain transmission filter used for the transmission of the periodic SRS.

TABLE 11

For a UE configured with one of more SRS resource configuration(s), and when the higher layer parameter SRS-ResourceConfigType is set to 'semi-persistent'
  when a UE receives an activation command [10, TS 38.321] for SRS resource set in slot n, the corresponding actions in [10, TS 38.321] and the UE assumptions on SRS transmission corresponding to the configured SRS resouice set shall be applied no later than the minimum requirement defined in [11, TS 38.133]. The activation command also contains spatial relation assumptions provided by a list of references to reference signal resources, one per element in the activated SRS resource set. Each entry in the list refers to either an SS/PBCH, NZP CSI-RS resource, or SRS resource.
  when a UE receives a deactivation command [10, TS 38.321] for activated SRS resource set in slot n, the corresponding actions in [10, TS 38.321] and UE assumption on cessation of SRS transmission corresponding to the deactivated SRS resource set shall apply no later than the minimum requirement defined in [11, TS 38.133]
  if the UE is configured with the higher layer parameter SRS-SpatialRelationInfo set to 'SSB/PBCH', the UE shall transmit the SRS resource with the same spatial domain transmission filter used for the reception of the SSB/PBCH, if the higher layer parameter SRS-SpatialRelationInfo is set to 'CSI-RS', the UE shall transmit the SRS resource with the same spatial domain transmission filter used for the reception of the periodic CSI-RS or of the semi-persistent CSI-RS, if the higher layer parameter SRS-SpatialRelationInfo is set to 'SRS', the UE shall transmit the SRS resource with the same spatial domain transmission filter used for the transmission of the periodic SRS or of the semi-persistent SRS.
  if an SRS resource in the activated resource set is configured with the higher layer parameter SRS-SpatialRelationInfo, the UE shall assume that the reference in the activation command to the reference signal resource overrides the one configured in SRS-SpatialRelationInfo.
For a UE configured with one or more SRS resource configuration(s), and when the higher layer parameter SRS-ResourceConfigType is set to 'aperiodic':
  the UE receives a configuration of SRS resource sets,
  the UE receives a downlink DCI, a group common DCI, or an uplink DCI based activation command where a codepoint of the DCI may activate one or more SRS resource set(s).
    if the UE is configured with the higher layer parameter SRS-SpatialRelationInfo set to 'SSB/PBCH', the UE shall transmit the SRS resource with the same spatial domain transmission filter used for the reception of the SSB/PBCH, if the higher layer parameter SRS-SpatialRelationInfo is set to 'CSI-RS', the UE shall transmit the SRS resource with the same spatial domain transmission filter used for the reception of the periodic CSI-RS or of the semi-persistent CSI-RS, or of the aperiodicle CSI-RS. If the higher layer parameter SRS-SpatialRelationInfo is set to 'SRS', the UE shall transmit the SRS resource with the same spatial domain transmission filter used for the transmission of the periodic SRS or of the semi-persistent SRS or of the aperiodic SRS.
If a UE is configured with the higher layer parameter SRS-AssocCSIRS and with the higher layer parameter ulTxConfig set to 'NonCodebook', the UE may be configured with a NZP CSI-RS resource where a NZP-CSI-RS-ResourceConfigId is associated with an SRS resource set.
For PUCCH formats 0 and 2, a UE shall not transmit SRS when semi-persistent and periodic SRS are configured in the same symbol(s) with PUCCH carrying only CSI report(s), or only L1-RSRP report(s) or if aperiodic SRS is configured and PUCCH consists of beam failure request. In the case that SRS is not transmitted due to overlap with PUCCH, only the SRS symbol(s) that overlap with PUCCH symbol(s) are dropped. PUCCH shall not be transmitted when aperiodic SRS happens to overlap in the same symbol with semi-persistent or periodic PUCCH carrying semi-persistent/periodic CSI report(s) or semi-persistent/periodic L1-RSRP report(s) only.
A UE is not expected to be configured with aperiodic SRS and PUCCH formats 0 or 2 with aperiodic CSI report in the same symbol.
A UE is not expected to be configured with SRS and PUSCH/UL DM-RS/UL PT-RS/PUCCH formats 1, 3 or 4 in the same symbol.
A UE shall not transmit simultaneously SRS resource(s) and PRACH. If a UE is configured with an SRS resource and PRACH in the same OFDM symbols in a slot. SRS is not transmitted in the overlapping symbols.

2-bit SRS request field in DCI format 0_1, 1_1 indicates a triggered SRS resource set given Table 12 below. 2-bit SRS request field in DCI format 2_3 indicates a triggered SRS resource set in Subclause 11.4 of TS 38.213. Table 12 shows SRS request value for aperiodic SRS.

TABLE 12

| Value of SRS request field | Description |
|---|---|
| '00' | No aperiodic SRS trigger |
| '01' | The 1st SRS resource set(s) configured by higher layers |
| '10' | The 2nd SRS resource set(s) configured by higher layers |
| '11' | The 3rd SRS resource set(s) configured by higher layers |

Table 13 below shows the description related to UE SRS frequency hopping procedure in the NR system.

TABLE 131

A UE may be configured to transmit an SRS resource on $N_s \in \{1,2,4\}$ adjacent symbols within the last six symbols of a slot, where all antenna ports of the SRS resource are mapped to each symbol of the resource. For a given SRS resource, the UE is configured with repetition factor $R \in \{1,2,4\}$ by higher layer parameter SRS-ResourceMapping where $R \cong N_s$. When frequency hopping within an SRS resource in each slot is not configured ($R = N_s$), all antenna ports of the SRS resource in each slot are mapped in each of the $N_s$ symbols to the same set of subcarriers in the same set of PRBs. When frequency hopping within as SRS resource in each slot is configured without repetition ($R = 1$), according to the SRS hopping parameters $B_{SRS}$, $C_{SRS}$ and $b_{hop}$, defined in Subclause 6.4.1,4 of [4, TS 38.211], all antenna ports of the SRS resource in each slot are mapped to different sets of subcarriers in each OFDM symbol, where the smile transmission comb value is assumed for different sets of subcarriers. When both frequency hopping and repetition within an SRS resource in each slot are configured ($N_s = 4$, $R = 2$), all antenna Polls of the SRS resource in each slot are mapped to the sante set of subcarriers within each pair of R adjacent OPDM symbols, and frequency hopping across the two pairs is according to the SRS hopping parameters $B_{SRS}$, $C_{SRS}$ and A UE may be configured $N_s = 2$ or 4 adjacent symbol aperiodic SRS resource with intra-slot frequency hopping within a bandwidth part, where the full hopping bandwidth is sounded with an equal-size subband across $N_s$ symbols when frequency hopping is configured with $R = 1$. A UE may be configured $N_s = 4$ adjacent symbols aperiodic SRS resource with intra-slot frequency hopping within a bandwidth part, where the full flopping bandwidth is sounded with an equal-size subband across two pairs of R adjacent OFDM symbols, when frequency hopping is configured with $R = 2$. All antenna ports of the SRS resource, are mapped to the same set of subcarriers within each pair of R adjacent OFDM symbols of the resource.

A UE may be configured $N_s = 1$ symbol periodic or semi-persistent SRS resource with inter-slot hopping within a bandwidth part, where the SRS resource occupies the same symbol location in each slot. A UE may be configured $N_s = 2$ or 4 symbol periodic or semi-persistent SRS resource with intra-slot and inter-slot hopping within a bandwidth part, where the N-symbol SRS resource occupies the same symbol location(s) in each slot. For $N_s = 4$, when frequency hopping is configured with $R = 2$, intra-slot and inter-slot hopping is supported with all antenna ports of the SRS resource mapped to different sets of subcarriers across two pairs of R adjacent OFDM symbol(s) of the resource in each slot. All antenna ports of the SRS resource are mapped to the same set of subcarriers within each pair of R adjacent OFDM symbols of the resource, in each slot. For $N_s = R$, when frequency hopping is configured. inter-slot frequency hopping, is supported with all antenna ports of the SRS resource mapped to the same set of subcarriers in R adjacent OFDM symbol(s) of the resource in each slot.

Table 14 below shows the description related to UE antenna switching in the NR system.

TABLE 14

When UE antenna switching is enabled by the higher layer parameter SRS-SetUse set as 'antenna switching' for a UE that supports transmit antenna switching, a UE may be configured with one of the following configurations depending on the UE capability:
  SRS resource set with two SRS resources transmitted in different symbols, each SRS resource consisting of a single SRS port being associated with different UE antenna ports, or
  SRS resource set with two SRS resources transmitted in different symbols, each SRS resource consisting of two SRS ports where the port pair of the second resource is associated with a different UE antenna pair than the port pair of the first resource, or
  SRS resource set with four SRS resources transmitted in different symbols, each SRS resource consisting of a single SRS port being associated with different UE antenna ports, TABLE 14-continued and a guard period where UE does not transmit any other signal of Y symbols in-between the SRS resources is used in case the SRS resources are transmitted in the same slot.
The value of Y is defined by Table 6.2.1.2-1.

Table 6.2.1.2-1: The minimum guard period between two SRS resources of an SRS resource set for antenna switching

| μ | $\Delta f = 2^\mu \cdot 15$ [kHz] | Y [symbol] |
|---|---|---|
| 0 | 15 | 1 |
| 1 | 30 | 1 |
| 2 | 60 | 1 |
| 3 | 120 | 2 |

Table 15 below shows the description related to UE sounding procedure between component carriers in the NR system.

TABLE 15

For a carrier of a serving cell with slot formats comprised of DL and UL symbols, not configured for PUSCH/PUCCH transmission, the UE shall not transmit SRS whenever SRS transmission (including any interruption due to uplink or downlink RF retuning time [11, TS 38.133] as defined by higher layer parameters rf-RetuningTimeUL and rf-RetuningTimeDL) on the carrier of the serving cell and PUSCH/PUCCH transmission carrying HARQ-ACK/positive SR/RI/CRI and/or PRACH happen to overlap in the same symbol_and that can result in uplink transmissions beyond the UE's indicated uplink carrier aggregation capability included in the [SRS__capability [13, TS 38.306].
For a carrier of a serving cell with slot formats comprised of DL and UL symbols, not configured for PUSCH/PUCCH transmission, the UE shall not transmit a periodic/semi-persistent type 0 SRS whenever periodic/semi-persistent SRS transmission (including any interruption due to uplink or downlink RF retuning time [11, TS 38.133] as defined by higher layer parameters rf-RetuningTimeUL and rf-RetuningTimeDL) on the carrier of the serving cell and PUSCH transmission carrying aperiodic CSI happen to overlap in the same symbol and that can result in uplink transmissions beyond the UE's indicated uplink carrier aggregation capability included in the [SRS_capability [13, TS 38.306].
For a carrier of a serving cell with slot formats comprised of DL and UL symbols, not configured for PUSCH/PUCCH transmission, the UE shall drop PUCCH/PUSCH transmission carrying periodic CSI comprising only CQI/PMI, and/or SRS transmission on another serving cell configured for PUSCH/PUCCH transmission whenever the transmission and SRS transmission (including any interruption due to uplink or downlink RF retuning time [11, TS 38,133] as defined by higher layer parameters rf-RetuningTimeUL, and rf-RetuningTimeDL) on the serving cell happen to overlap in the same symbol and that can result in uplink transmissions beyond the UE's indicated uplink carrier aggregation capability included in the [SRS_capability [13, TS 38.306].
For a carrier of a serving cell with slot formats comprised of DL and UL symbols, not configured for PUSCH/PUCCH transmission, the UE shall drop PUSCH transmission carrying aperiodic CSI comprising only CQI/PMI whenever the transmission and aperiodic SRS transmission (including any interruption due to uplink or downlink RF retuning time [11, TS 38.133]) as defined by higher layer parameters rf-RetuningTimetUL and rf-RetuningTimeDL) on the carrier of the serving cell happen to overlap in the same symbol and that can result in uplink transmissions beyond the UP's indicated uplink carrier aggregation capability included in the [SRS_capability [13, TS 38.306].
[A UE can be configured with SRS resource(s) on a carrier $c_1$ with slot formats comprised of DL and UL symbols and not configured for PUSCH/PUCCH transmission. For carrier $c_1$, the UE is configured with higher layer parameter srs-SwitchFromServCellIndex the switching from carrier $c_2$ which is configured for PUSCH/PUCCH transmission. During SRS transmission on carrier $c_1$ (including any interruption due to uplink or downlink RF retuning time [11, TS 38.133] as defined by higher layer parameters rf-RetuningTimeUL and rf-RetuningTimeDL), uplink transmission is interrupted on carrier $c_2$]
[If the UE is not configured for PUSCH/PUCCH transmission on carrier $c_1$ with slot formats comprised of DL and UL symbols, and if the UE is not capable of simultaneous reception and transmission on carrier $c_1$ and serving cell $c_2$, the UF is not expected to be configured or indicated with SRS resource(s) such that SRS transmission on carrier $c_1$ (including any interruption due to uplink or downlink RF retuning time [11, TS 38.133] as defined by higher layer parameters rf-RetuningTimeUL and rf-RetuningTimeDL) would collide with the REs corresponding to the SS/PBCH blocks configured for the UE or the slots belonging to a control resource set indicated by [SystemInformationBlockType0] or [SystemInformationBlockType1] on serving cell $c_2$]

Analog Beamforming

In the millimeter wave (mmW) system, a short wavelength is used, and thus a plurality of antennas elements can be installed in the same area. In other words, the wavelength in the 30 GHz band is 1 cm, and accordingly a total of 64 (8×8) antenna elements may be installed at intervals of 0.5 lambda (wavelength) in a 2-dimensional array on a 4 by 4 cm panel. Therefore, in the mmW system, multiple antenna elements may be used to increase the beamforming (BF) gain to enhance the coverage or the throughput.

In this case, if each antenna element is provided with a transceiver unit (TXRU) to enable adjustment of transmit power and phase per antenna element, independent beamforming may be performed for each frequency resource. However, installing TXRUs in all the 100 antenna elements is less feasible in terms of cost. Therefore, a method of mapping a plurality of antenna elements to one TXRU and adjusting the direction of a beam using an analog phase shifter has been considered. However, this analog beamforming technique is disadvantageous in that frequency selective beamforming is not allowed because only one beam direction can be created over the full band.

As an intermediate form of digital BF and analog BF, hybrid BF with B TXRUs which are fewer than Q antenna elements may be considered. In the hybrid BF, the number of directions in which beams are allowed to be transmitted at the same time is limited to B or less, though it depends on how the B TXRUs and Q antenna elements are connected.

Figure 2A:
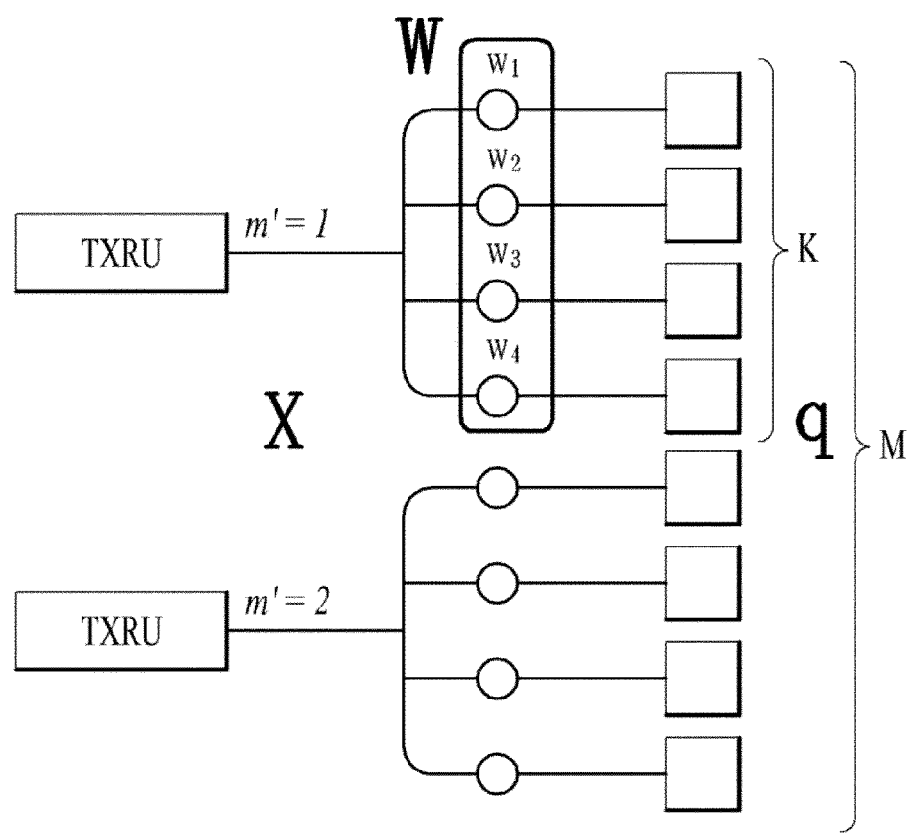
FIG. 2A is a diagram illustrating TXRU virtualization model option 1 (a sub-array model)
Figure 2B:
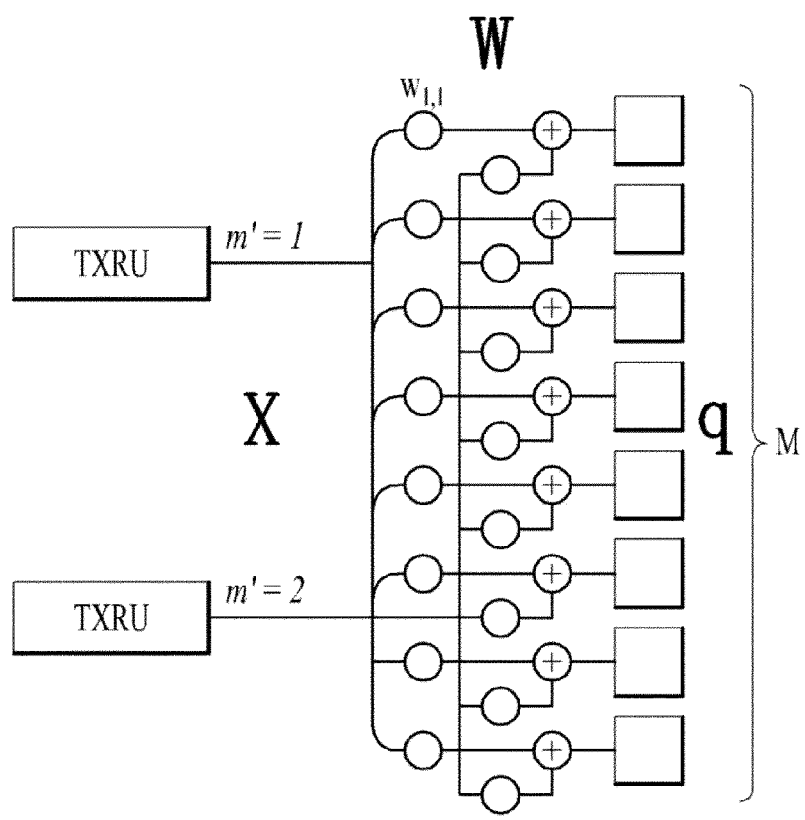
FIG. 2B is a diagram illustrating TXRU virtualization model option 2 (a full connection model).

FIG. 2A is a diagram illustrating TXRU virtualization model option 1 (a sub-array model), and FIG. 2B is a diagram illustrating TXRU virtualization model option 2 (a full connection model).

FIGS. 2A and 2B show representative examples of a method for connection of a TXRU and an antenna element. Here, the TXRU virtualization model shows the relationship between the output signal of the TXRU and the output signal of the antenna elements. FIG. 2A illustrates a scheme in which a TXRU is connected to a sub-array. In this case, the antenna elements are connected to only one TXRU. In contrast, FIG. 2B illustrates a scheme in which a TXRU is connected to all antenna elements. In this case, the antenna elements are connected to all TXRUs. In FIGS. 2A and 2B, W denotes a phase vector multiplied by an analog phase shifter. That is, the direction of analog beamforming is determined by W. Here, the mapping between the CSI-RS antenna ports and the TXRUs may be 1-to-1 or 1-to-many mapping.

Hybrid Beamforming

Figure 3:
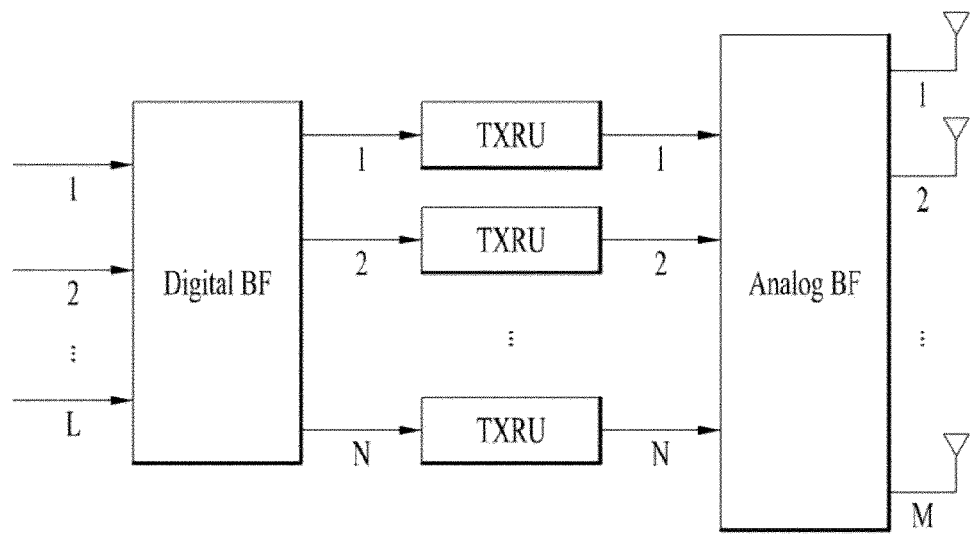
FIG. 3 is a block diagram for hybrid beamforming.

FIG. 3 is a block diagram for hybrid beamforming.

When multiple antennas are used in the New RAT system, a hybrid beamforming technique combining digital beamforming and analog beamforming may be used. In this case, analog beamforming (or RF beamforming) refers to an operation of performing precoding (or combining) in the RF stage. In the hybrid beamforming technique, each of the baseband stage and the RF stage may use precoding (or combining), thereby reducing the number of RF chains and the number of D/A (or a A/D) converters and exhibiting performance close to that of digital beamforming. As shown in FIG. 3, the hybrid beamforming structure may be represented by N transceiver units (TXRU) and M physical antennas for simplicity. Then, the digital beamforming for the L data layers to be transmitted from the transmitting side may be represented by an N by L matrix, and then N converted digital signals are converted into analog signals through the TXRUs and then subjected to analog beamforming represented by an M by N matrix.

FIG. 3 is an schematic diagram of a hybrid beamforming structure in terms of the TXRU and physical antennas. In FIG. 3, the number of digital beams is L, and the number of analog beams is N. Further, in the New RAT system, it is considered to design the base station to change analog beamforming on a symbol-by-symbol basis to support more efficient beamforming for a UE located in a specific area. Further, when N TXRUs and M RF antennas are defined as one antenna panel in FIG. 3, the New RAT system may introduce a plurality of antenna panels to which independent hybrid beamforming is applicable.

When a BS utilizes a plurality of analog beams, an analog beam which is advantageous for signal reception may differ among the UEs, and therefore a beam sweeping operation in which the BS changes a plurality of analog beams to be applied in a specific subframe (SF) on a symbol-by-symbol basis to allow all UEs to have a reception occasion may be considered.

Figure 4:
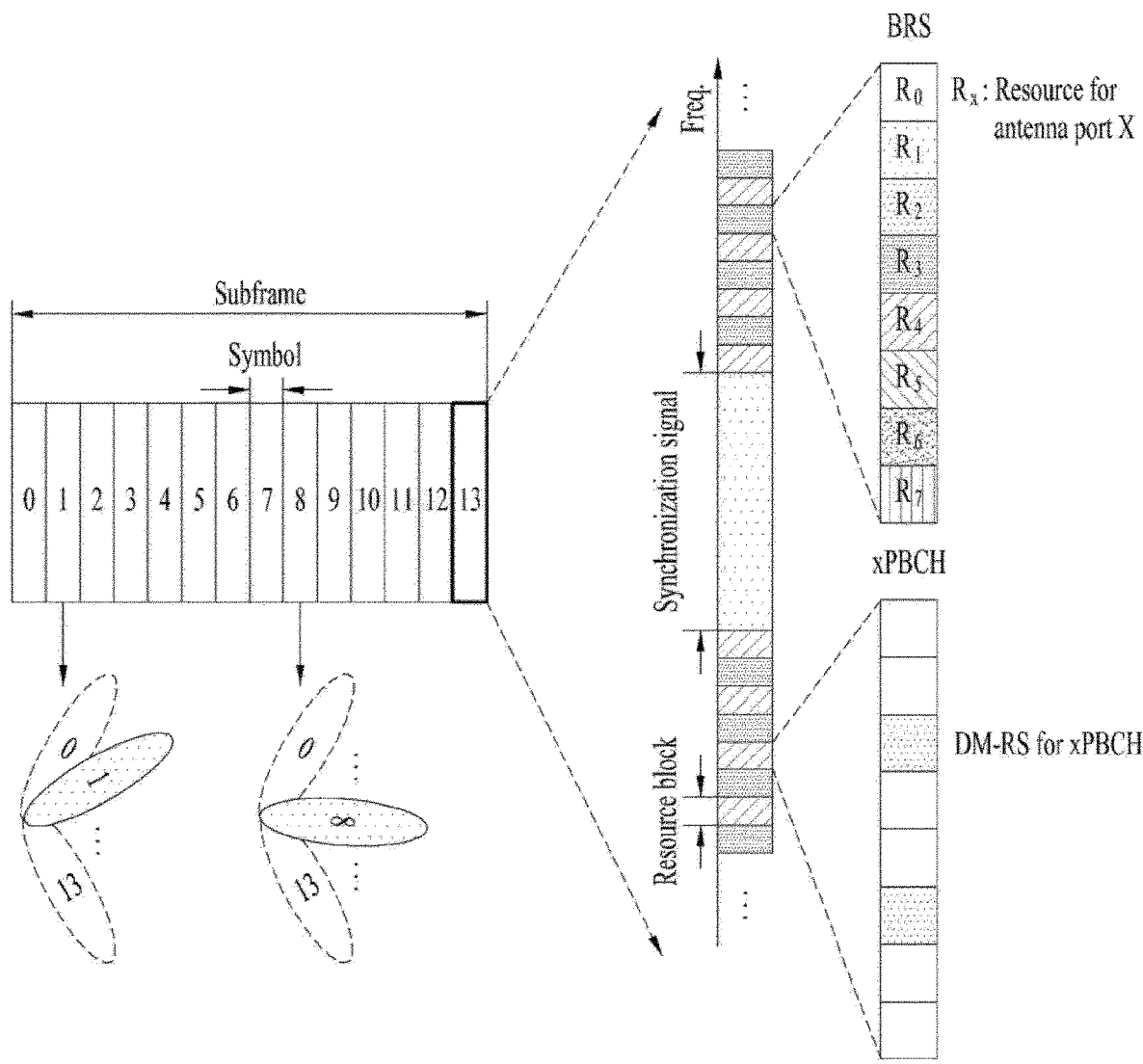
FIG. 4 is a diagram illustrating an example of beams mapped to BRS symbols in hybrid beamforming.

FIG. 4 is a diagram illustrating an example of beams mapped to BRS symbols in hybrid beamforming.

FIG. 4 illustrates the beam sweeping operation for a synchronization signal and system information in a downlink (DL) transmission process. In FIG. 4, a physical resource (or physical channel) on which the system information of the New RAT system is transmitted in a broadcast manner is referred to as a xPBCH (physical broadcast channel). Analog beams belonging to different antenna panels within one symbol may be transmitted simultaneously, and introduction of a beam RS (BRS) may be considered. the BRS is a reference signal (RS) transmitted by applying a single analog beam (corresponding to a specific antenna panel) as shown in FIG. 4 to measure a channel for each analog beam. The BRS may be defined for a plurality of antenna ports, and each antenna port of the BRS may correspond to a single analog beam. While the RS used to measure a beam is referred to as BRS in FIG. 4, it may be called by another name. In this case, unlike the BRS, the synchronization signal or the xPBCH may be transmitted by applying all analog beams in an analog beam group such that any UE can receive the synchronization signal or the xPBCH well.

Figure 5:
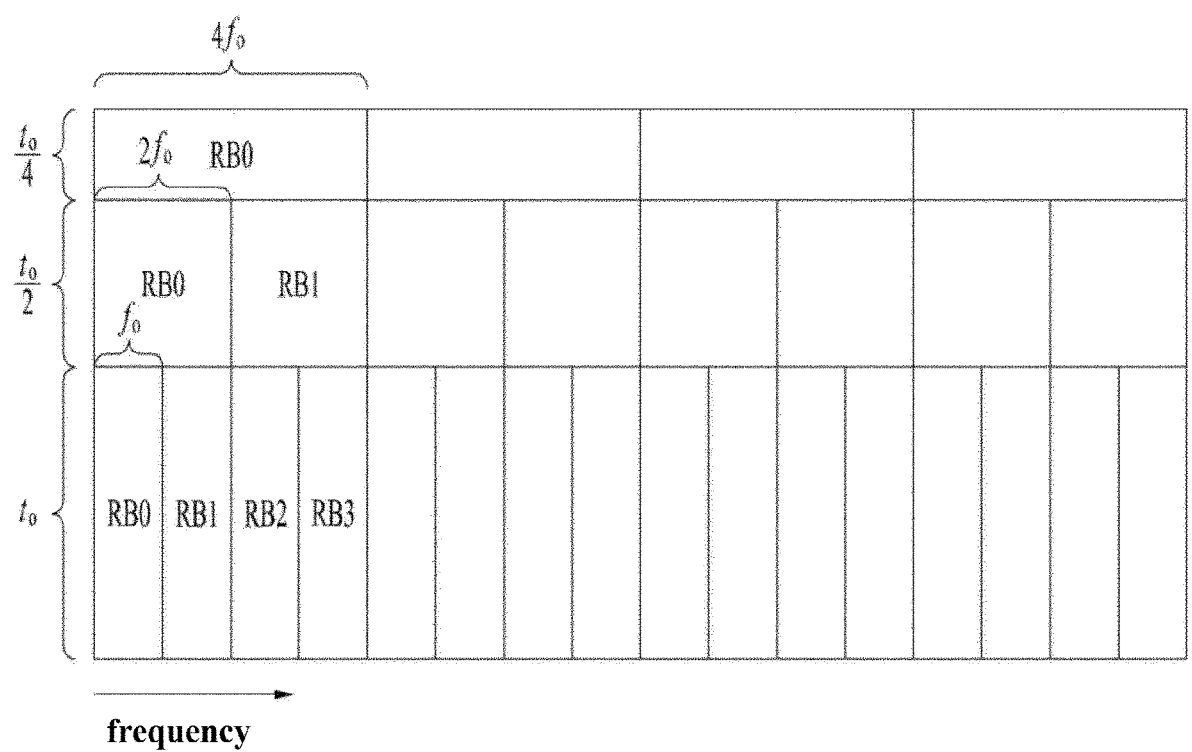
FIG. 5 is an exemplary diagram illustrating symbol/sub-symbol alignment between different numerologies.

FIG. 5 is an exemplary diagram illustrating symbol/sub-symbol alignment between different numerologies.

Features of New RAT (NR) Numerology

In the NR system, a method of supporting scalable numerology is considered. In other words, NR subcarrier spacing is expressed as (2n×15) kHz, where n is an integer. From the nested perspective, the above-mentioned subset or a superset (at least 15, 30, 60, 120, 240, and 480 kHz) is considered as the main subcarrier spacing. Symbol or sub-symbol alignment between different numerologies is supported by adjusting the numerologies to have the same CP overhead rate.

Also, numerology is determined in a structure in which the above-described time/frequency granularity is dynamically allocated according to the respective services (eMMB, URLLC, mMTC) and scenarios (high speed, etc.).

Bandwidth Dependent/Non-Dependent Sequence for Orthogonalization

The LTE system designs the SRS differently according to the sounding bandwidth. That is, a computer generated sequence is used for a sequence design with a length of 24 or less, and a Zadoff-Chu (ZC) sequence is used when the length is 36 (3 RBs) or more. The greatest advantage of the ZC sequence is that it exhibits low PAPR or low cubic metric and has ideal autocorrelation and low cross-correlation properties. However, in order to satisfy the above properties, the lengths of the required sequences (representing the sounding bandwidths) must be the same. Therefore, in order to support UEs having different sounding bandwidths, a method of allocating the UEs to different resource regions is needed. In order to minimize deterioration of channel estimation performance, IFDMA comb structures are configured to have different sounding bandwidths to support orthogonality of UEs that perform transmission simultaneously. If a transmission comb (TC) structure is used for a UE having a small sounding bandwidth, a sequence length that is less than the minimum sequence length with orthogonality (typically represented by length 24) may be given. Accordingly, TC is limited to 2. If the same TC is given on the same sounding resource, a dimension that provides orthogonality is needed, which employs CDM using cyclic shift.

There are sequences which have slightly lower PAPR and correlation performance than the ZC sequence but can be subjected to resource mapping regardless of the sounding bandwidth. Examples of such sequences include a Golay sequence and a pseudo random (PN) sequence. In the case of Golay sequences, when autocorrelation values of sequences a and b are $A_a$ and $A_b$, the sequences a and b are called a Golay complementary sequence pair if the sum of the autocorrelation values satisfies the following condition: $A_a+A_b=\delta(x)$).

Figure 6:
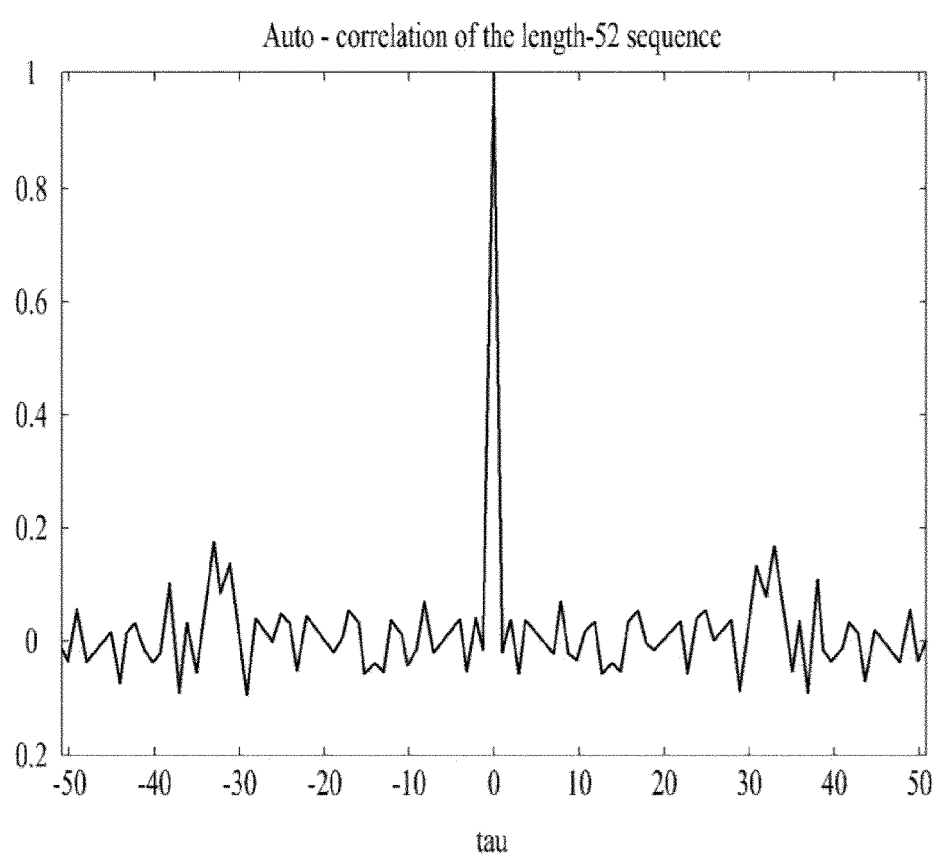
FIG. 6 illustrates performance of 52-length autocorrelation using two 26-length Golay Complementary Sequence pairs.

As an example, when Golay sequences a and b of length 26 are a=[1 −1 1 1 −1 −1 1 −1 −1 −1 −1 1 −1 1 −1 −1 −1 −1 1 1 −1 −1 −1 1 −1 1] and b=[−1 1 1 −1 −1 1 1 −1 1 1 1 1 −1 −1 −1 −1 −1 −1 −1 1 1 −1 −1 −1 1 −1 1], a length-52 sequence may be configured by concatenating the two sequences, and when 0 is mapped to 4 resource elements (REs) on both sides, the auto-correlation performance may be obtained as shown in FIG. 6. FIG. 6 shows the performance of 52-length autocorrelation using two 26-length Golay complementary sequence pairs.

Figure 7:
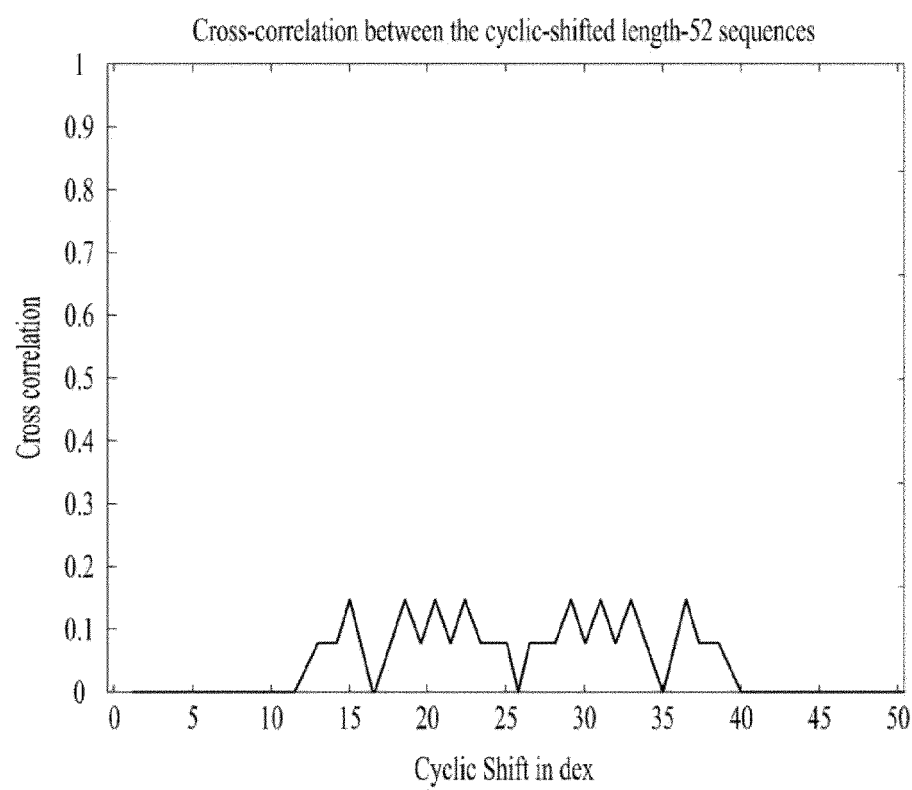
FIG. 7 illustrates cross-correlation between sequences having different CSs in a Golay sequence of length 52.

FIG. 7 illustrates cross-correlation between sequences having different CSs in a Golay sequence of length 52.

A plurality of Golay sequences may be generated by applying multiple cycle shifts (CS) to the sequence configured to have the length-52. Cross-correlation between Golay sequences subjected to different CSs is shown in FIG. 7.

Figure 8:
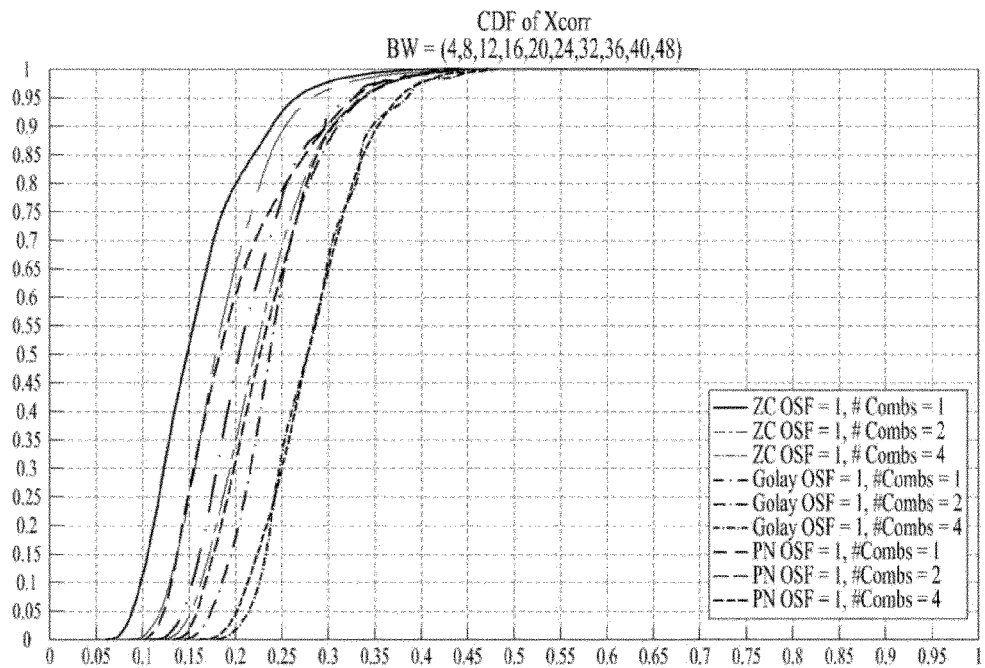
FIG. 8 illustrates cross-correlation and cubic-metric evaluation of ZC, Golay, and PN sequences.
Figure 8:
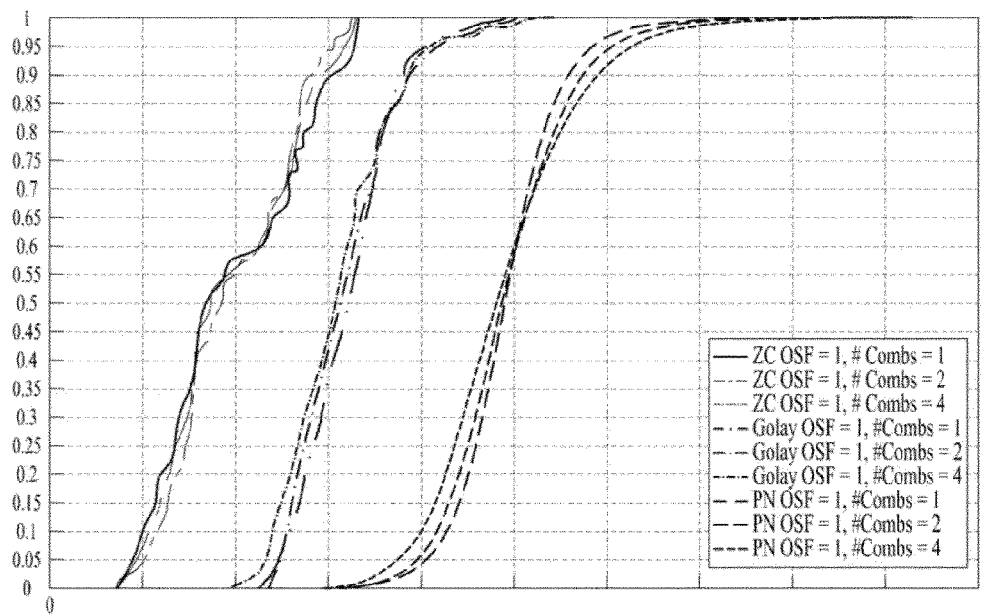

FIG. 8 illustrates cross-correlation and cubic-metric evaluation of ZC, Golay, and PN sequences.

For the relationship between the ZC, Golay, and PN sequences, cubic metric (CM) and cross-correlation were calculated according to cases where TC is 1, 2, and 4, respectively, and the calculation results of the respective cases were compared with each other. The assumptions which are made for the evaluation are as follows.

The sounding bandwidth is set to 4, 8, 12, 16, 20, 24, 32, 36, and 48RB (based on LTE SRS design).

As in the LTE system, the 30 groups number $u=f_{gh}(n_s)+f_{ss}$)mod 30 is determined as follows, and ($f_{gh}(n_s)$, $f_{ss}$) is determined based on cell ID. When the bandwidth is 4 RBs, one base sequence v is selected. For the other bandwidths, two base sequence numbers v are selected.

For the Golay sequence, a truncated binary Golay sequence with length 2048 in the 802.16m system was used, and a QPSK PN sequence is shown as an example of an independent bandwidth SRS design. In order to represent 30 groups in the ZC sequence, the Golay sequence was generated using 30 CSs, and 30 PN sequences were generated based on Matlab.

Evaluation was conducted with TC=1, 2 and 4.

For cubic metric evaluation, the oversampling factor (OSF) was set to 8 for better resolution.

Referring to FIG. 8(a), the ZC sequence exhibited higher cross correlation performance than the Golay sequence, which exhibited higher cross correlation performance than the PN sequence (ZC>Golay>PN). The ZC sequence exhibited higher CM performance than the Golay sequence, which exhibited higher CM performance than the PN sequence (ZC>Golay>PN). In terms of generation of an SRS sequence for UL transmission, the ZC sequence may be seen as exhibiting better performance as in the LTE system. However, in order to increase the degree of freedom of each UE in allocating the sounding bandwidth, the Golay sequence or the PN sequence may also be considered as a SRS sequence candidate of the New RAT system.

Table 16 below shows methods for generating SRS sequences.

TABLE 16

To down-select one method for NR SRS sequence generation based on at least the following alternatives:
Alt-1: SRS sequence is a function of the sounding bandwidth and does not depend on the sounding bandwidth position or the PRB position.
Sequence design and other design details are FFS.
Alt-2: SRS sequence is a function of the sounding bandwidth position or the PRB position.
Sequence design and other design details are FFS.
Taking into account metrics such as PAPR, capacity/flexibility, etc.
Other parameters, if any, determining SRS sequence are FFS (e.g. SRS sequence ID)

For SRS sequence generation methods in the NR system, the methods of Alt-1 and Alt-2 in Table 16 may be considered. In Alt-1, an SRS bandwidth is configured and then used to generate a sequence, but the sequence is generated irrespective of the SRS resource start position. An example of this method may be the LTE SRS sequence generation and mapping method.

A sequence that is a function of the sounding bandwidth represents the ZC sequence. In other words, in the ZC-based sequence $$x_q(m) = e^{-j\frac{\pi qm(m+1)}{N_{ZC}^{RS}}}, 0 \le m \le N_{ZC}^{RS} - 1, N_{ZC}^{RS}$$

is seen as a function of bandwidth. Sequences that can be generated regardless of the SRS bandwidth may be PN-based sequences or Golay-based sequences.

Table 17 below shows the principle for generating SRS sequence using SRS sequence ID in the NR system.

TABLE 17

Support SRS sequence ID to generate SRS sequences where SRS sequence
ID is UE specifically configured using
  RRC.
  UE specific ID (example: C-RNTI) which can be overwritten by RRC signaling
  for combination of RRC and DCI
Root(s) of Zadoff-Chu based sequence(s) of an SRS sequence is at least a function of SRS sequence ID
  Examples:
  The function is parameterized only by SRS sequence ID
  The function is parameterized by SRS sequence ID, length of SRS sequence, SRS sequence scheduled time
  The function is a random number generator, intended for sequence, hopping with a SRS sequence ID as a random seed
  The function is parameterized by SRS sequence ID, scheduled time and frequency location of the SRS sequence The LTE system does not provide a root value directly to generate each SRS base sequence but generates virtual cell (VC) ID to change a root value every SRS transmission time, and then the generated VC ID is used as inter cell interference randomization between sequences having different lengths by calculating a changeable root value using the generated VC ID. This ID is called as "SRS ID" by providing it UE-specifically, whereby discussion for a method for using the SRS ID is required. That is, the range that the SRS ID is used has become wider, and therefore the root value may be varied at SRS transmission timing UE-specifically. However, in the LTE system, flexibility of this SRS ID may cell-specifically be provided for a root value, and the respective root value is allocated to each cell by dividing root groups to reduce inter-cell interference for the root value (that is, a function of a slot is represented as a group hopping pattern $f_{gh}(n_s)$ and the root value being scrambled by VCID may be allocated, or a specific group number u value is not changed in accordance with a slot change during sequence hopping but a base sequence number v value has a value of 0 or 1 in accordance with a slot (at 6 RBs or more)), but the respective root value is allocated UE-specifically using SRS ID unlike the LTE system.

At this time, in view of inter-cell interference mitigation, it is important that root values are allocated to have orthogonal relation between the root values or low correlation between root values in overlapping resource regions to which sequences having different lengths are allocated or in the same resource region of each cell, abovementioned allocating methods has advantages in view of inter-cell interference control. If a root change occurs at each SRS transmission time instance in a fixed resource relation, the root value of low correlation may be indicated based on SRS transmission timing. However, if SRS resource moves in accordance with a random hopping pattern, it is preferable that the root value is provided to establish a low correlation considering this hopping pattern.

Also, if SRS of connected or concatenated blocks is introduced in the NR, a method for providing a root value for each block is required. That is, SRS ID equivalent to the number of blocks configured for the root value for each block is required. However, a problem occurs in that this configuration considerably causes complexity of base sequence generation for inter-cell interference mitigation. The block is a unit time-frequency resource for SRS transmission, and may be a resource block (RB) unit as an example. The block called in this closure for convenience is a concept corresponding to a unit of SRS transmission. In the NR, SRS of the concatenated blocks may be transmitted.

Table 18 and Table 19 below show a method for generating sequences using cell ID and a root value in the LTE system.

TABLE 18

The sequence-group number u in slot $n_s$ is defined by a group hopping pattern $f_{gh}(n_s)$ and a sequence-shift pattern $f_{ss}$ according to
u = $(f_{gh}(n_s) + f_{ss})$ mod30
There are 17 different hopping patterns and 30 different sequence-shift patterns. Sequence-group hopping can be enabled or disabled by the cell-specific parameter Group-hopping-enabled provided by higher layers. Sequence-group hopping for PUSCH can be disabled for a certain UE through the higher-layer parameter Disable-sequence-group-hopping despite being enabled on a cell basis unless the PUSCH transmission corresponds to a Random Access Response Grant or a retransmission of the same transport block as part of the contention based random access procedure.
The group-hopping pattern $f_{gh}(n_s)$ may be different for PUSCH, PUCCH and SRS and is given by $$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases}$$

where the pseudo-random sequence c(i) is defined by clause 7.2. The pseudo-random sequence generator shall be initialized with 
$$c_{init} = \left\lfloor \frac{n_{ID}^{RS}}{30} \right\rfloor$$

at the beginning of each radio frame where $n_{ID}^{RS}$ is given by clause 5.5.1.5.
The sequence-shift pattern $f_{ss}$ definition differs between PUCCH, PUSCH and SRS.
For SRS, the sequence-shift pattern $f_{ss}^{SRS}$ is given by $f_{ss}^{SRS} = n_{ID}^{RS}$ mod30 where $n_{ID}^{RS}$ is given by clause 5.5.1.5.

TABLE 19

Sequence hopping only applies for reference-signals of length $M_{sc}^{RS} \geq 6N_{sc}^{RB}$.
For reference-signals of length $M_{sc}^{RS} < 6N_{sc}^{RB}$, the base sequence number v within the base sequence group is given by v = 0.
For reference-signals of length $M_{sc}^{RS} \geq 6N_{sc}^{RB}$, the base sequence number v within the base sequence group in slot $n_s$ is defined by $$v = \begin{cases} c(n_s) & \text{if group hopping is disabled and sequence hopping is enabled} \\ 0 & \text{otherwise} \end{cases}$$

where the pseudo-random sequence c(i) is given by clause 7.2. The parameter Sequence-hopping-enabled provided by higher layers deteremines if sequence hopping is enabled or not.

TABLE 19-continued

Sequence hopping for PUSCH can be disabled for a certain UE through the higher-layer parameter Disable-sequence-group-hopping despite being enabled on a cell basis unless the PUSCH transmission corresponds to a Random Access Response Grant or a retransmission of the same transport block as part of the contention based random access procedure.
For SRS, the pseudo-random sequence generator shall be initialized with $$c_{init} = \left\lfloor \frac{n_{ID}^{RS}}{30} \right\rfloor \cdot 2^5 + (n_{ID}^{RS} + \Delta_{ss}) \bmod 30$$

at the beginning of each radio frame where $n_{ID}^{RS}$ is given by clause 5.5.1.5 and $\Delta_{ss}$ is given by clause 5.5.1.3.
Sounding reference signals: $n_{ID}^{RS} = N_{ID}^{cell}$.

$$x_q(m) = e^{-j\frac{\pi q m(m+1)}{N_{ZC}^{RS}}}, \ 0 \le m \le N_{ZC}^{RS} - 1$$

with $q$ given by $$q = \lfloor \bar{q} + 1/2 \rfloor + v \cdot (-1)^{\lfloor 2\bar{q} \rfloor}$$

$$\bar{q} = N_{ZC}^{RS} \cdot (u + 1)/31$$

Table 20 shows a description related to SRS resources in the NR system.

TABLE 20

An SRS resource consists of $N_{ap}^{SRS} \in \{1, 2, 4\}$ antenna ports $\{p_i\}_{i=0}^{N_{ap}^{SRS}-1}$, $p_i \in \{1000, 1001, \ldots\}$, given by the higher layer parameter *NrofSRS*-Ports $N_{symb}^{SRS} \in \{1, 2, 4\}$ consecutive OFDM symbols contained in the higher layer parameter SRS-ResourceMapping
$l_0$, the starting position in the time domain given by $l_0 = N_{symb}^{slot} - 1 - l_{offset}$ where the offset $l_{offset} \in \{0, 1, \ldots, 5\}$ counts symbols backwards from the end of the slot and is contained in the higher layer parameter SRS-ResourceMapping
$k_0$, the frequency-domain starting position of the sounding reference signal Table 21 shows a description related to SRS sequence generation in the NR system.

TABLE 21

The sounding reference signal sequence for an SRS resource shall be generated according to
$r^{(p_i)}(n,l') = r_{u,v}^{(\alpha_i, \delta)}(n)$
$0 \le n \le M_{sc,b}^{RS} - 1$
$l' \in \{0,1, \ldots, N_{symb}^{SRS} - 1\}$
where $M_{sc,b}^{RS}$ is given by clause 6.4.1.4.3, $r_{u,v}^{(\alpha_i, \delta)}(n)$ is given by clause 5.2.2 with $\delta = \log_2(K_{TC})$ and the transmission comb number $K_{TC}$ is contained in the higher-layer parameter SRS-TransmissionComb. The cyclic shift $\alpha_i$ for antenna port $p_i$ is given as $$\alpha_i = 2\pi \frac{n_{SRS}^{cs,i}}{n_{SRS}^{cs,max}}$$

$$n_{SRS}^{cs,i} = \left(n_{SRS}^{cs} + \frac{n_{SRS}^{cs,max}(p_i - 1000)}{N_{ap}}\right) \bmod n_{SRS}^{cs,max}$$

where $n_{SRS}^{cs} \in \{0,1, \ldots, n_{SRS}^{cs,max} - 1\}$ is given by the higher layer parameter SRS-CyclicShiftConfig. The maximum number of cyclic shifts is $n_{SRS}^{cs,max} = 12$ if $K_{TC} = 4$ and $n_{SRS}^{cs,max} = 8$ if $K_{TC} = 2$.
The sequence group $u = (f_{gh}(n_{s,f}^\mu, l') + n_{ID}^{SRS}) \bmod 30$ and the sequence number v in clause 5.2.2 depends on the higher-layer parameter SRS-GroupSequenceHopping. The SRS sequence identity $n_{ID}^{SRS}$ is given by the higher layer parameter SRS-SequenceID and $l' \in \{0,1, \ldots, N_{symb}^{SRS} - 1\}$ is the OFDM symbol number within the SRS resource.
if SRS-GroupSequenceHopping equals 'neither', neither group, nor sequence hopping shall be used and $$f_{gh}(n_{s,f}^\mu, l') = 0$$

$$v = 0$$

TABLE 21-continued if SRS-GroupSequenceHopping equals 'groupHopping', group hopping but not sequence hopping shall be used and $$f_{gh}(n_{s,f}^\mu, l') = \left(\sum_{m=0}^{7} c\left(8\left(n_{s,f}^\mu N_{symb}^{slot} + l_0 + l'\right) + m\right) \cdot 2^m\right) \bmod 30$$
$$v = 0$$

where the pseudo-random sequence c(i) is defined by clause 5.2.1 and shall be initialized with
$c_{init} = \lfloor n_{ID}^{SRS}/30 \rfloor$ at the beginning of each radio frame.
if SRS-GroupSequenceHopping equals 'sequenceHopping', sequence hopping but not group hopping shall be used and $$f_{gh}(n_{s,f}^\mu, l') = 0$$

$$v = \begin{cases} c\left(n_{s,f}^\mu N_{symb}^{slot} + l_0 + l'\right) & M_{sc,b}^{SRS} \geq 6N_{sc}^{RB} \\ 0 & \text{otherwise} \end{cases}$$

where the pseudo-random sequence c(i) is defined by clause 5.2.1 and shall be initialized with
$c_{init} = n_{ID}^{SRS}$ at the beginning of each radio frame.

Proposal 1

If concatenated blocks for SRS transmission are generated and configured, the base station may define a base block in the concatenated blocks. The base block may be determined by the base station, and the block having the lowest block index among the concatenated blocks may previously be defined as the base block.

The UE may generate a root value corresponding to one (for example, base block) of the concatenated blocks by using UE-specific unique SRS ID (for example, SRS ID=cell ID in the LTE system). In order that the UE may generate root values corresponding to the other blocks, the base station may provide the UE with root offset values corresponding to the corresponding blocks through RRC signaling as Layer 3 signaling, MAC-CE as Layer 2 signaling or DCI (Downlink Control Information) signaling as Layer 1 signaling.

Proposal 1-1

For generation of base sequences of blocks except the base block, the UE determines a root value of each block by means of combination of SRS ID and a root offset value corresponding to each block. That is, the root value may be expressed by a function of the root value of the base block and the corresponding root offset value like $q_k=f(q_0(SRS\_ID),\Delta_k)$.

Figure 9:
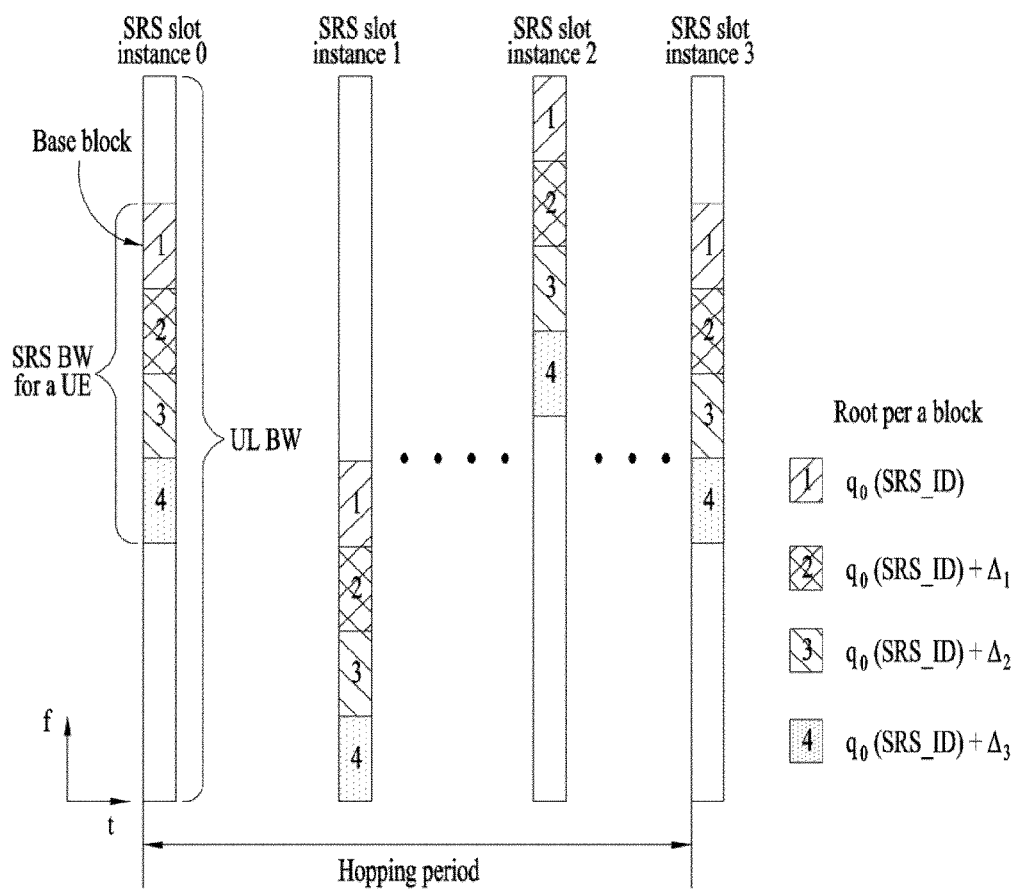
FIG. 9 illustrates that single SRS ID is provided to one UE and block-wise root is generated (the number of blocks=4).

FIG. 9 illustrates that single SRS ID is provided to one UE and block-wise root is generated (the number of blocks=4).

Referring to FIG. 9, the root value of each block may be obtained by adding the root value acquired by SRS ID and the root offset to each other. For example, $q_k=q_0(SRS\_ID)+\Delta_k$ is obtained. The base station transmits all root offset values $\Delta_k$ for the respective blocks to the UE. For example, as shown in FIG. 9, the base station may set a root offset value $\Delta_2$ for a block index 2, a root offset value $\Delta_2$ for a block index 3, and a root offset value $\Delta_3$ for a block index 3 and then notify the UE of the root offset values. The base station may set each root offset value such that low PAPR/CM may be formed, and then may provide the set root offset value to the UE.

Proposal 1-2

A value proportional to each block index may be applied to the root offset value. For example, the root offset value may be $\Delta_k=k\cdot\Delta_1$, $q_k=q_0(SRS\_ID)+k\cdot\Delta_1$. Therefore, the base station may transmit only a first root offset value $\Delta$ to the UE.

Proposal 1-3

A set indicating specific root offset may be set depending on the number of blocks. The base station may transmit a root offset configuration index from the set indicating specific root offset to the UE through RRC signaling or DCI signaling. Each root offset configuration index may include the number of corresponding blocks and information on a root offset value corresponding to each of the corresponding blocks, and its examples may be as listed in Table 22.

TABLE 22

| Root configuration index | The number of blocks = 1 | The number of blocks = 2 | The number of blocks = 4 |
| --- | --- | --- | --- |
| 0 | $\Delta_1 = 3$ | $\Delta_1 = 3, \Delta_2 = 2$ | $\Delta_1 = 4, \Delta_2 = 3, \Delta_3 = 2$ |
| 1 | $\Delta_1 = 4$ | $\Delta_1 = 4, \Delta_2 = 5$ | $\Delta_1 = 3, \Delta_2 = 2, \Delta_3 = 2$ |
| 2 | $\Delta_1 = 5$ | $\Delta_1 = 3, \Delta_2 = 1$ | $\Delta_1 = 5, \Delta_2 = 1, \Delta_3 = 4$ |

Proposal 1-4

The root value of each block should be determined within the range of a root value that may be set. For example, the root value is as $q_k=(q_0(SRS\_ID)+\Delta_k)\bmod 30$.

Proposal 1-5

This root value is set, for inter-cell interference randomization, variably per SRS transmission instance. $q_0=f(SRS\_ID,n_s), q_k=f(q_0(SRS\_ID,n_s),\Delta_k)$ is obtained, wherein $n_s$ may be SRS transmission slot index or SRS transmission symbol index or subframe index or a counter for each SRS transmission instance.

Proposal 2

The base station may allow the UE to apply one SRS ID and a root offset value to all blocks when configuring concatenated blocks for SRS transmission. Therefore, there is no base block in the configured concatenated blocks, and the UE may generate a root value of a corresponding block by means of combination of one SRS ID which is provided for all blocks and a root offset corresponding to each block.

Proposal 2-1

A set indicating specific root offset may be configured depending on the number of blocks. The base station may transmit a root offset configuration index from the set indicating specific root offset to the UE through RRC signaling or DCI signaling. Each root offset configuration index may include the number of corresponding blocks and information on a root offset value corresponding to each of the corresponding blocks, and its examples may be as listed in Table 23.

TABLE 23

| Root configuration index | The number of blocks = 1 | The number of blocks = 2 | The number of blocks = 3 |
| --- | --- | --- | --- |
| 0 | $\Delta_1 = 3$ | $\Delta_1 = 3, \Delta_2 = 2$ | $\Delta_1 = 4, \Delta_2 = 3, \Delta_3 = 2$ |
| 1 | $\Delta_1 = 4$ | $\Delta_1 = 4, \Delta_2 = 5$ | $\Delta_1 = 3, \Delta_2 = 2, \Delta_3 = 2$ |
| 2 | $\Delta_1 = 5$ | $\Delta_1 = 3, \Delta_2 = 1$ | $\Delta_1 = 5, \Delta_2 = 1, \Delta_3 = 4$ |

Proposal 2-2

This root value may be set, for inter-cell interference randomization, variably per SRS transmission instance. $q_0=f(SRS\_ID,n_s), q_k=f(q_0(SRS\_ID, n_s),\Delta_k)$ is obtained, wherein $n_s$ may be SRS transmission slot index or SRS transmission symbol index or subframe index or a counter for each SRS transmission instance.

Proposal 3

The base station may determine a root value of another block not the base block by means of combination of one SRS ID, root offset and information on time and frequency domains in which SRS is configured, when configuring concatenated blocks for SRS transmission, and may provide the UE with determined root value. For example, the root value may be expressed as $q_k=f(q_0(SRS\_ID),\Delta_k,f_{SRS},t_{SRS})$. In this case, $f_{SRS}$ may be information (for example, resource block (RB) index, resource element (RE) index, RB or RE position corresponding to a start and end of SRS resources, block position index, block index, etc.) indicating SRS resource frequency position, and $t_{SRS}$ may be information (for example, slot index to which SRS is transmitted, symbol index to which SRS is transmitted, etc.) indicating SRS resource time position.

Proposal 3-1

The base station sets root values of all blocks configured by combination of one SRS_ID, root offset and information on time and frequency domains in which SRS is configured, when configuring concatenated blocks for SRS transmission. For example, the root value may be expressed as $q_k=f(SRS\_ID,\Delta_k,f_{SRS},t_{SRS})$. In the same manner as the proposal 3, $f_{SRS}$ may be information (for example, resource block (RB) index, resource element (RE) index, RB or RE position corresponding to a start and end of SRS resources, block position index, block index, etc.) indicating SRS resource frequency position, and $t_{SRS}$ may be information (for example, slot index to which SRS is transmitted, symbol index to which SRS is transmitted, etc.) indicating SRS resource time position.

Proposal 4

For inter-cell interference randomization of each block, the base station may configure concatenated blocks to allow base sequence generation parameters (for example, root, cyclic shift (CS), transmission comb(TC), TC offset, etc.) to be applied to blocks shuffled per SRS transmission slot or symbol. The base station may transmit information on a shuffling pattern to the UE through RRC signaling. The UE generates a base sequence generation parameter per block within a hopping period, and generates the same sequence parameters in accordance with the shuffling pattern.

Figure 10:
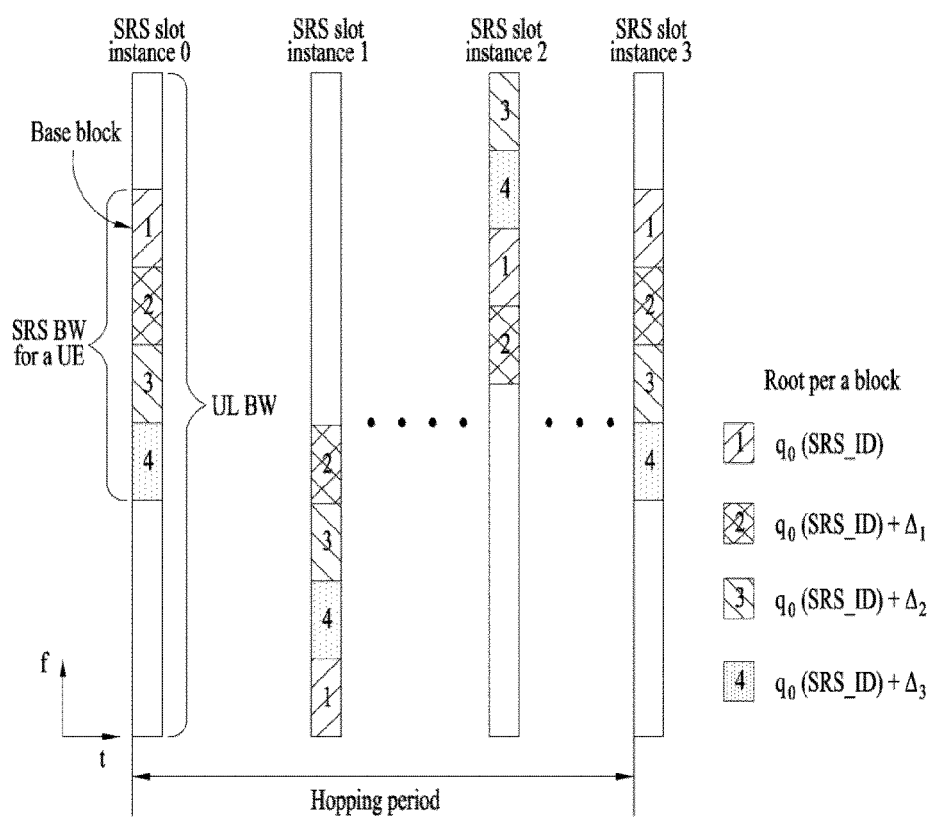
FIG. 10 illustrates an example (particularly, example of root value shuffling) of shuffling at a hoping period within SRS bandwidth between concatenated blocks which are allocated.

FIG. 10 illustrates an example (particularly, example of root value shuffling) of shuffling at a hoping period within SRS bandwidth between concatenated blocks which are allocated.

As shown in FIG. 10, the number of concatenated blocks for SRS transmission of a specific UE is 3, sequence generation parameters of the first block are root 1, CS1, TC1, and TC offset1, sequence generation parameters of the second block are root 2, CS2, TC2, and TC offset2, and sequence generation parameters of the third block are root 3, CS3, TC3, and TC offset3. When a shuffling pattern function is equal to $B_{l+1}=(B_l+1)\mod 3$, $B_l$ is a current block index, and when $B_{l+1}$ is expressed as a shuffled block index at next SRS transmission timing (transmission timing is marked as SRS slot instance in FIG. 10), a block position at next SRS transmission timing is shuffled as much as +1. Related generation parameters are applied to correspond to a function of $B_{l+1}=(B_l+1)\mod 3$. For example, if $B_l=1$, $B_{l+1}=2$ is obtained and generation parameters root1, CS1, TC1 and TC offset1 may be applied at $B_{l+1}=2$.

As shown in FIG. 10, the UE may transmit SRS at a first SRS transmission timing (for example, SRS slot instance 0 in FIG. 10), and may transmit SRS at a transmission pattern different from SRS transmission pattern at the first SRS transmission timing in accordance with the shuffling pattern (for example, pattern for changing the order in the frequency domain of concatenated blocks) according to the configuration of the base station at the second SRS transmission timing (for example, SRS slot instance 1 in FIG. 10).

Proposal 4-1

A hopping pattern at a slot or symbol is applied only in the base block, and at this time, the other blocks except the base block may be configured to perform hopping in accordance with a base block hopping pattern. The UE may apply the hopping pattern only in the base block, and may transmit SRS by performing hopping in accordance with the hopping pattern of the base block.

Proposal 4-2

The UE may perform a block-wise type hopping pattern at a slot or symbol as a hopping pattern for SRS transmission. At this time, in order to avoid collision (that is, the case that there is great correlation between overlapped blocks) between blocks, the base station may configure hopping between blocks so as not to overlap (for example, different TCs or different TC offsets are applied), or may configure hopping between blocks so as to have low correlation (for example, root or CS is provided) if overlapped.

Proposal 4-3

A block-wise hopping pattern or block-wise shuffling pattern at a slot or symbol may be expressed as a function of a single UE-specific SRS ID such as $B_{l+1}=f(B_l, SRS\_ID)$. For example, if the number of blocks is 3, the pattern may be expressed as $B_{l+1}=(B_l+SRS\_ID)\mod 3$.

As described above, the UE may improve flexible utilization of uplink resources through a method for generating a root value of each block using SRS ID and SRS hopping method indicating a root value varied depending on SRS transmission slot or symbol timing through SRS ID in a state that the UE generates ZC based sequence at a block length and SRS BW (concatenated blocks) are configured by connecting these blocks.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method for generating SRS sequence and the UE therefor are industrially applicable to various kinds of mobile communication systems such as 3GPP LTE/LTE-A system, 5G communication system, etc.

The invention claimed is:

1. A method for generating a sounding reference symbol (SRS) sequence by a user equipment (UE), the method comprising the steps of:
calculating a first root value for SRS sequence generation of a first block among concatenated blocks configured for SRS transmission based on a UE-specific SRS identifier;
calculating a second root value for SRS sequence generation of a second block based on the calculated first root value and a root offset value; and
generating the SRS sequence for SRS transmission on the concatenated blocks by applying the first root value to the first block and applying the second root value to the second block.

2. The method of claim 1, further comprising the step of receiving control information including information on the UE-specific SRS identifier or the root offset value from a base station.

3. The method of claim 2, wherein the information on the root offset value includes root offset values respectively related to the second block and a third block when the concatenated blocks include the third block.

4. The method of claim 3, wherein the root offset values respectively related to the second block and the third block are different from each other.

5. The method of claim 2, wherein the control information is received through radio resource control (RRC) signaling, MAC control element (CE) or downlink control information (DCI).

6. The method of claim 3, further comprising the step of generating the SRS sequence for the third block by applying, to the third block, the first root value and the root offset value related to the third block when the concatenated blocks include the third block.

7. The method of claim 1, wherein the first block is determined by a base station or is related to a block having a lowest block index among the concatenated blocks.

8. The method of claim 1, further comprising the step of transmitting the SRS on the concatenated blocks to which the generated SRS sequence is applied.

9. The method of claim 1, wherein the first block and the second block are resources configured on a resource block (RB) basis.

10. The method of claim 1, further comprising the steps of:
transmitting a first SRS on first concatenated blocks related to the concatenated blocks to which the generated SRS sequence is applied, at a first SRS transmission timing;
generating an SRS sequence for second concatenated blocks in the same manner as the SRS sequence generation manner for the first concatenated blocks; and
transmitting a second SRS on the second concatenated block to which SRS sequence for the generated concatenated blocks is applied, at a second SRS transmission timing,
wherein the second concatenated blocks are related to blocks configured by position change of the first concatenated blocks on a frequency domain.

11. The method of claim 10, wherein the first concatenated blocks and the second concatenated blocks are overlapped with each other on the frequency domain.

12. A method for generating a sounding reference symbol (SRS) sequence in a user equipment (UE), the method comprising the steps of:
calculating a first root value for SRS sequence generation of a first block among concatenated blocks configured for SRS transmission, based on a UE-specific SRS identifier; and
generating the SRS sequence for SRS transmission on the concatenated blocks by applying the first root value to the first block and applying a second root value to a second block,
wherein the second root value is determined based on the UE-specific SRS identifier, a root offset value, and a position of a resource for the SRS transmission.

13. The method of claim 12, further comprising the step of receiving information on the second root value from a base station.

14. The method of claim 12, wherein the first block is determined by a base station or is related to a block having a lowest block index among the concatenated blocks, and the second block is related to one or more blocks among the concatenated blocks, other than the first block.

15. A UE for generating a sounding reference symbol (SRS) sequence, the UE comprising a processor configured to calculate a first root value for SRS sequence generation of a first block among concatenated blocks configured for SRS transmission, based on a UE-specific SRS identifier, calculate a second root value for SRS sequence generation of a second block based on the calculated first root value and a root offset value, and generate the SRS sequence for SRS transmission on the concatenated blocks by applying the first root value to the first block and applying the second root value to the second block.

16. The UE of claim 15, further comprising a receiver configured to receive control information including information on the UE-specific SRS identifier or the root offset value from a base station.

17. The UE of claim 15, wherein the processor is further configured to generate the SRS sequence by applying, to the third block, the first root value and the root offset value related to a third block when the concatenated blocks include the third block.

18. The UE of claim 15, further comprising a transmitter configured to transmit the SRS on the concatenated blocks to which the generated SRS sequence is applied.

19. A UE for generating a sounding reference symbol (SRS) sequence, the UE comprising a processor configured to calculate a first root value for SRS sequence generation of a first block among concatenated blocks configured for SRS transmission, based on a UE-specific SRS identifier, and generate the SRS sequence for SRS transmission on the concatenated blocks by applying the first root value to the first block and applying a second root value to a second block,
  wherein the second root value is determined based on the UE-specific SRS identifier, a root offset value, and a position of a resource for the SRS transmission.

20. The UE of claim 19, further comprising a receiver configured to receive information on the second root value from a base station.

* * * * *